(12) United States Patent
Martinez-Guerra et al.

(10) Patent No.: US 6,523,172 B1
(45) Date of Patent: Feb. 18, 2003

(54) PARSER TRANSLATOR SYSTEM AND METHOD

(75) Inventors: Juan Carlos Martinez-Guerra, Austin, TX (US); Tina L. Timmerman, Austin, TX (US); Katherine G. Hammer, Austin, TX (US); David H. Marshall, Austin, TX (US)

(73) Assignee: Evolutionary Technologies International, Inc., Austin, TX (US)

( * ) Notice: Subject to any disclaimer, the term of this patent is extended or adjusted under 35 U.S.C. 154(b) by 0 days.

(21) Appl. No.: 09/253,158

(22) Filed: Feb. 19, 1999

Related U.S. Application Data
(60) Provisional application No. 60/112,677, filed on Dec. 17, 1998.

(51) Int. Cl.[7] .................................... G06F 9/45
(52) U.S. Cl. ............... 717/143; 717/112; 704/9; 707/4; 707/101
(58) Field of Search ............... 707/4, 10, 523, 707/102, 101, 103 Y, 103 Z; 717/5, 8, 112, 143; 709/223; 704/9, 2

(56) References Cited

U.S. PATENT DOCUMENTS

| | | | |
|---|---|---|---|
| 5,493,671 A | | 2/1996 | Pitt et al. ............... 395/500 |
| 5,557,776 A | * | 9/1996 | Brown et al. ............... 717/7 |
| 5,584,024 A | * | 12/1996 | Shwartz ............... 707/4 |

(List continued on next page.)

FOREIGN PATENT DOCUMENTS

DE 0442240 A2 * 8/1991 ............... G06F/9/44

OTHER PUBLICATIONS

Metadata Interchange Specification, Version 1.1 Metadata Interchange Specification (MDIS), Aug. 1, 1997, pp. 1–92.

Meta Data Coalition, "The Meta Data Interchange Specification Initiative", Jun. 20, 1997, pp. 1–10, http://mdcinfo.com/papers/intro97.html.

(List continued on next page.)

Primary Examiner—Tuan Q. Dam
(74) Attorney, Agent, or Firm—Zagorin, O'Brien & Graham, LLP

(57) ABSTRACT

A parser-translator technology allows a user to specify complex test and/or transformation statements in a high-level user language, to ensure that such test and/or transformation statements are well-formed in accordance with a grammar defining legal statements in the user language, and to translate statements defined by the user into logically and syntactically correct directives for performing the desired data transformations or operations. Using the parser-translator technology, a user can focus on the semantics of the desired operations and need not be concerned with the proper syntax of a language for a particular system. Instead, grammars (i.e., data) define the behavior of a parser-translator implementation by encoding the universe of statements (e.g., legal test and/or transformation statements) and by encoding translations appropriate to a particular data processing application (e.g., a data conversion program, etc.). Some parser-translator implementations described herein interface dynamically with other systems and/or repositories to query for information about objects, systems and states represented therein, and/or their respective interfaces. Some grammars described herein encode sensitivity to an external context. In this way, context-sensitive prompting and validation of correct specification of statements is provided. A combination of parser technology and dynamic querying of external system state allows users to build complex statements (e.g., using natural languages within a user interface environment) and to translate those complex statements into statements or directives appropriate to a particular data processing application.

43 Claims, 13 Drawing Sheets

U.S. PATENT DOCUMENTS

| | | | | | |
|---|---|---|---|---|---|
| 5,596,744 | A | * | 1/1997 | Dao et al. | 395/610 |
| 5,634,053 | A | * | 5/1997 | Noble et al. | 707/4 |
| 5,708,828 | A | | 1/1998 | Coleman | 395/785 |
| 5,812,840 | A | * | 9/1998 | Shwartz | 707/4 |
| 5,842,205 | A | | 11/1998 | Brann | 707/4 |
| 6,041,330 | A | * | 3/2000 | Carman et al. | 707/101 |
| 6,055,370 | A | * | 4/2000 | Brown et al. | 395/705 |
| 6,125,391 | A | * | 9/2000 | Meltzer et al. | 709/223 |
| 6,151,702 | A | * | 11/2000 | Overturf et al. | 717/5 |
| 6,192,369 | B1 | * | 2/2001 | Doan et al. | 707/103 |
| 6,377,993 | B1 | * | 4/2002 | Brandt et al. | 709/227 |
| 6,389,538 | B1 | * | 5/2002 | Gruse et al. | 713/194 |

OTHER PUBLICATIONS

Meta Data Coalition, "Meta Data Coalition Announces Business Rules Initiative", Sep. 28, 1998, pp. 1–2, http://mdcinfo.com/press/prl9980928.html.

Ross, Kenneth M., "An Improved Left–Corner Parsing Algorithm", North–Holland Publishing Company, 1982, pp. 333–338.

Hammer, Dr. Katherine, "Managing Heterogeneous Data Environments *A Survey of Available Tools*", Evolutionary Technologies International, Austin, Texas, 1995–1997, pp. 1–9.

Hammer, Dr. Katherine, "The Importance of Metadata in Reducing the Cost of Change", Evolutionary Technologies International, Austin, Texas, 1995–1997, pp. 1–5.

* cited by examiner

PARSER TRANSLATOR SYSTEM AND METHOD

This application claims benefit of U.S. Provisional Application Serial No. 60/112,677, filed Dec. 17, 1998.

Portions of the disclosure of this patent document contain material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to specification of data transformation statements, and in particular, to systems, methods and computer program products for interactively defining data transformations.

2. Description of the Related Art

Automated transformation of data from one or more source formats, systems, database environments, or schemas, to one or more targets has become an important enabling technology for managing heterogeneous data environments, for migrating data from legacy systems to newer data environments, for creating so-called "application islands," and for data warehousing or otherwise maintaining multiple instances of the same semantic information. The need for such automated data transformation is driven in part by rapid changes in computing and information systems technology, but also by business changes such as the acquisition and merging of business units, by year 2000 (Y2K) issues, by growth and/or change of business focus, by the use of enterprise planning, front office and back office systems, by increasing demands by customers, suppliers, and business partners for real-time or near-real time data, and by competitive pressures that demand timely operational data to support management decisions.

Large information technology departments face formidable challenges in transforming data. For example, even when incorporating off-the-shelf packaged applications, the level of effort required to integrate the off-the-shelf application into a pre-existing data environment can be substantial. Indeed, some estimates place the level of effort associated with data conversion alone at 40% of overall effort for integrating enterprise-wide software applications. Companies frequently address the data conversion challenge by building teams of programmers and consultants to hand-code programs to convert and integrate the required data. Unfortunately, converting large amounts of data can be a time-consuming and difficult process, even for skilled programmers. Automated tools are a practical necessity.

The need for automated data conversion tools goes well beyond simple, one-time, transformation of data from a legacy source format to that required by a new software and/or hardware system. Data conversion programs, sometimes called data bridge programs, are often written when an organization does any of the following.

1. Integration of a new application that uses a different data format into a pre-existing computing environment. For example, suppose a company becomes self-insured and buys a flexible benefits software package. To use the package, the company must extract data from a personnel database, a payroll database (perhaps in a flat file form), a claim system (which could be maintained out of house), a general ledger, and other financial data stores. It is very likely that the systems reside on different platforms and use different data formats. Moreover, once the new system has been implemented and integrated, the company will have an ongoing need to access data from these original sources, as well as to apply changes to some of these databases to reflect changes in the flexible benefits system.

2. Modification of a data structure definition (schema) used by a database management system. When a software support organization develops a new application (perhaps to reflect new equipment being deployed in the field), it is often necessary to modify the schema definition of various databases to reflect the new information. This process can require dumping the data content of the original database and reloading the data content into the new record types, along with information about the new equipment or application, which may be stored in a flat file or database.

3. Integration of data from multiple sources or reports for use with decision support tools. Companies typically store related data on a variety of different systems in different data formats. For example, business data are typically stored in an environment dominated by older applications and storage formats, whereas engineering data may be stored in an object-oriented database on a workstation and simulation data may be stored in a flat file on a mainframe. Periodic planning often requires that data from the various systems be collected and integrated.

Although brute force, hand-coding techniques have been, and continue to be, used in support of the above, data-driven techniques are preferable because of their flexibility and because they can allow non-technical personnel to define appropriate data transformations. One such data-driven environment is the ETI-EXTRACT® Tool Suite available from Evolutionary Technologies International, Inc. of Austin, Texas (ETI-EXTRACT is a registered trademark of Evolutionary Technologies International, Inc). The ETI-EXTRACT Tool Suite is an extensible set of software tools for automating the generation and execution of data conversion programs. Because the tool suite is data-driven, functionality can be added without changing the ETI-EXTRACT code itself. In general, the data that drives the tool suite includes (1) internal databases that store metadata, i.e., data about data, describing the structure and format of source and target data sets and (2) transformation rules. Using the ETI-EXTRACT Tool Suite, transformational rules are developed using grammars that define the universe of legal transformation statements. In this way, transformational rules developed using the ETI-EXTRACT Tool Suite are correct by construction.

In the information systems arts, the use of metadata is emerging as a critical element in effective information resource management. Vendors and users alike recognize the value of metadata; however, the rapid proliferation of data manipulation and management tools has resulted in information technology products that represent and process metadata differently and without consideration for sharing of metadata. To enable full-scale enterprise data management, different information tools must be able to freely and easily access, update, and share metadata. One viable mechanism to enable disparate tools from different vendors to exchange metadata is a common metadata interchange specification. Another is through repositories (e.g., a Microsoft Repository with its Open Information Model and Oracle's Repository with its Common Warehouse Model) with business models and tools to interchange information about these business models with other applications.

Although there is currently no generally deployed standard for metadata exchange, a number of products (e.g., CASE tools and data repositories) do have the ability to exchange metadata with a subset of other products. A proposed Meta Data Interchange Specification (MDIS) created by the Meta Data Coalition, is a file-based exchange format currently supported by a variety of vendors. Unfortunately, metadata exchange is only part of the solution. While having a standard metadata exchange mechanism is critical, with one exception, it is relatively easy to relate the metamodels used by different tools. The exception is business rules, i.e., the functional logic used to test and transform data values.

In general, users today specify business rules in one of three ways: (1) SQL or some proprietary control language (2) fragments of code such as of COBOL, C++ or BASIC, (3) code fragments with embedded SQL or (4) merely as documentation strings. These representations are unfortunate for two reasons. First, for products that require code blocks or some Fourth Generation Language (4GL), the user of the product must have some technical training. Second, and more importantly, such encodings make it extremely difficult for products to exchange business rules. Systems and methods are desired that allow interoperability and exchange of business rules or test and transformation logic (e.g., as part of metadata exchange) are desired.

SUMMARY OF THE INVENTION

Accordingly, a parser-translator technology has been developed to allow a user to specify complex test and/or transformation statements in a high-level user language, to ensure that such test and/or transformation statements are well-formed in accordance with a grammar defining legal statements in the user language, and to translate statements defined by the user into logically and syntactically correct directives for performing the desired data transformations or operations. In some embodiments configured for transforming data represented in one or more databases, code-generation for a particular data access system, access language and/or database installation is performed. In some embodiments, the parser-translator technology is configured as a software component for use in providing user interface functionality. In some embodiments, multiple instances of a parser-translator component, each with a corresponding grammar, provide multiple software applications with a common interface to high-level user language statements, whether stored in a computer readable medium or interactively supplied by a user. In some embodiments, a single parser-translator component provides multiple software applications with an interface to high-level user language statements wherein operation of the single parser-translator component is suitably defined for each software application using a corresponding grammar encoding.

Using the developed parser-translator technology, a user can focus on the semantics of the desired operations and need not be concerned with the proper syntax of a language for a particular system. Instead, grammars (i.e., data) define the behavior of a parser-translator implementation by encoding the universe of statements (e.g., legal test and/or transformation statements) and by encoding translations appropriate to a particular data processing application (e.g., a data conversion program, etc.).

Parser-translator implementations in accordance with certain embodiments of the present invention interface dynamically with other systems and/or repositories to query for information about objects, systems and states represented therein, and/or their respective interfaces. Grammars in accordance with embodiments of the present invention encode context-sensitivity. In this way, context-sensitive prompting and validation of correct specification of statements is provided. A combination of parser technology and dynamic querying of external system state allows users to build complex statements (e.g., using natural languages within a user interface environment) and to translate those complex statements into statements or directives appropriate to a particular data processing application.

In one merely exemplary data processing application, the complex statements define test and/or transformation logic and the data processing application manipulates contents of a data store (or stores) in accordance with the test and/or transformation logic. By sharing the same context-sensitive grammar framework, software tools vendors can define a subset of a natural language to be used in specifying business rules in such a way that enterprise tools from various vendors and targeted at various data access or decision support functions may freely exchange such business rules. By supplying vendor- or tool-specific translation rules and external query handlers, a single context-sensitive grammar framework can be used to define business rules that may be used by a multiplicity of tools employing parser-translator technology in accordance with an embodiment of the present invention.

In one embodiment in accordance with the present invention, an apparatus includes an instance of a parser-translator software component and a software tool operable with the parser-translator instance. The parser-translator instance is executable to read an input stream encoding at least one business rule and to evaluate the input stream in conjunction with a grammar encoding an external query. The software tool is operable with the parser-translator instance to receive an output thereof corresponding to the business rule. By operation of the external query, the output is sensitive to an external context.

In another embodiment in accordance with the present invention, a method of operating a data processing program in accordance with at least one business rule includes: reading an input stream encoding the business rule, evaluating the input stream in accordance with a grammar encoding an external query to least one externally represented data or metadata state, performing, in the context of the evaluating, the external query; and supplying an operating directive for the data processing program. The operating directive corresponds to the business rule and is sensitive to the externally-represented data or metadata state. In one variation, the input stream evaluating includes: recognizing tokens from the input stream, parsing the tokens, and translating a sequence of the tokens to produce the operating directive.

In still another embodiment in accordance with the present invention, a system for providing business rule interoperability in a computing environment includes a computer readable encoding of a grammar and a parser-translator component. The grammar encoding includes (i) rules descriptive of legal statements in a data transformation language for transforming between a first format and a second format and (ii) entries descriptive of data transformation language elements in the legal statements. At least one of the entries specifies an external query to resolve a corresponding data transformation language element at evaluation time. The parser-translator component is executable to read an input stream encoding at least one business rule and to evaluate the input stream in conjunction with the grammar encoding including the external query and, based thereon, to define a data transformation. In a variation, the system further includes a second computer readable encoding of a second grammar. The second grammar encoding is also readable by the parser-translator component and thereby allows the parser-translator component to read the input stream and define a second data transformation based thereon.

In still another embodiment in accordance with the present invention, a data-driven system for providing business rule interoperability amongst multiple data processing programs includes first and second grammar encodings, an input stream encoding at least one business rule, and a single parser-translator component. The first and second grammar encodings are respectively specific to first and second data processing programs and both first and second grammar encodings including an external query. Based on the first grammar encoding, the single parser-translator component parses the input stream and translates the input stream into a first data transformation for use in conjunction with the first data processing program. Based on the second grammar encoding, the single parser-translator component parses the input stream and translates the input stream into a second data transformation for use in conjunction the second data processing program. In some variations, the input stream includes an interactive stream. In some variations, the input stream includes a batch stream.

In still yet another embodiment in accordance with the present invention, a method of interactively specifying a transformation of data from a first representation to a second representation thereof includes supplying a computer readable encoding of a grammar and based on the grammar encoding, presenting a user with choices. The grammar includes syntax rules and dictionary entries. The syntax rules are descriptive of legal sequences of tokens in a data transformation language. The dictionary entries are descriptive of terminal ones of the tokens. The dictionary entries include at least a first and a second entry respectively descriptive of at least first and second tokens. The first entry specifies at least one data transformation language element corresponding to the first token, and the second entry specifies an action to dynamically-query an external data source to resolve at least one data transformation language element corresponding to the second token. The method includes presenting a user with at least one choice for a first element in a data transformation statement in accordance with the syntax rules and presenting a user with successive at least one choices for successive elements in the data transformation statement in accordance with the syntax rules. At least one of the successive element presentings includes performing a dynamic query in accordance with the second entry of the dictionary.

In still yet another embodiment in accordance with the present invention, a computer program product includes a grammar encoded by or transmitted in at least one computer readable medium. The grammar includes a set of phrase structure rules defining legal orderings of tokens in the data transformation language, a dictionary of entries descriptive of terminal ones of the tokens, and at least one encoding of a query to an external data or metadata store.

In still yet another embodiment in accordance with the present invention, a method for interactively specifying a data transformation statement in accordance with a grammar including (i) rules defining legal orderings of tokens in a data transformation language for transforming between a first data representation in a first data store and second data representation and (ii) dictionary entries descriptive of terminal ones of said tokens includes at least two steps. First, supplying a computer readable encoding of the grammar, wherein a function identifier is associated with at least one of the dictionary entries. The function identifier encodes a run-time query to the first data store or metadata corresponding thereto. Second, based on the grammar, presenting a human user with choices for successive elements in the data transformation statement, wherein at least one of the choices is resolved by the run-time query.

In still yet another embodiment in accordance with the present invention, a data processing system includes first and second data stores and parser-translator means. The first data store encodes a grammar defining legal data transformation statements in accordance with a predetermined data transformation language. The second data store encodes metadata descriptive of a structure of a first data set. The parser-translator means is executable to access the first and second data stores and has a user interface allowing a human user to interactively define a data transformation statement in accordance with the grammar. At least one element of the data transformation statement is selected by the human user from alternatives resulting from a dynamic query of the metadata.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
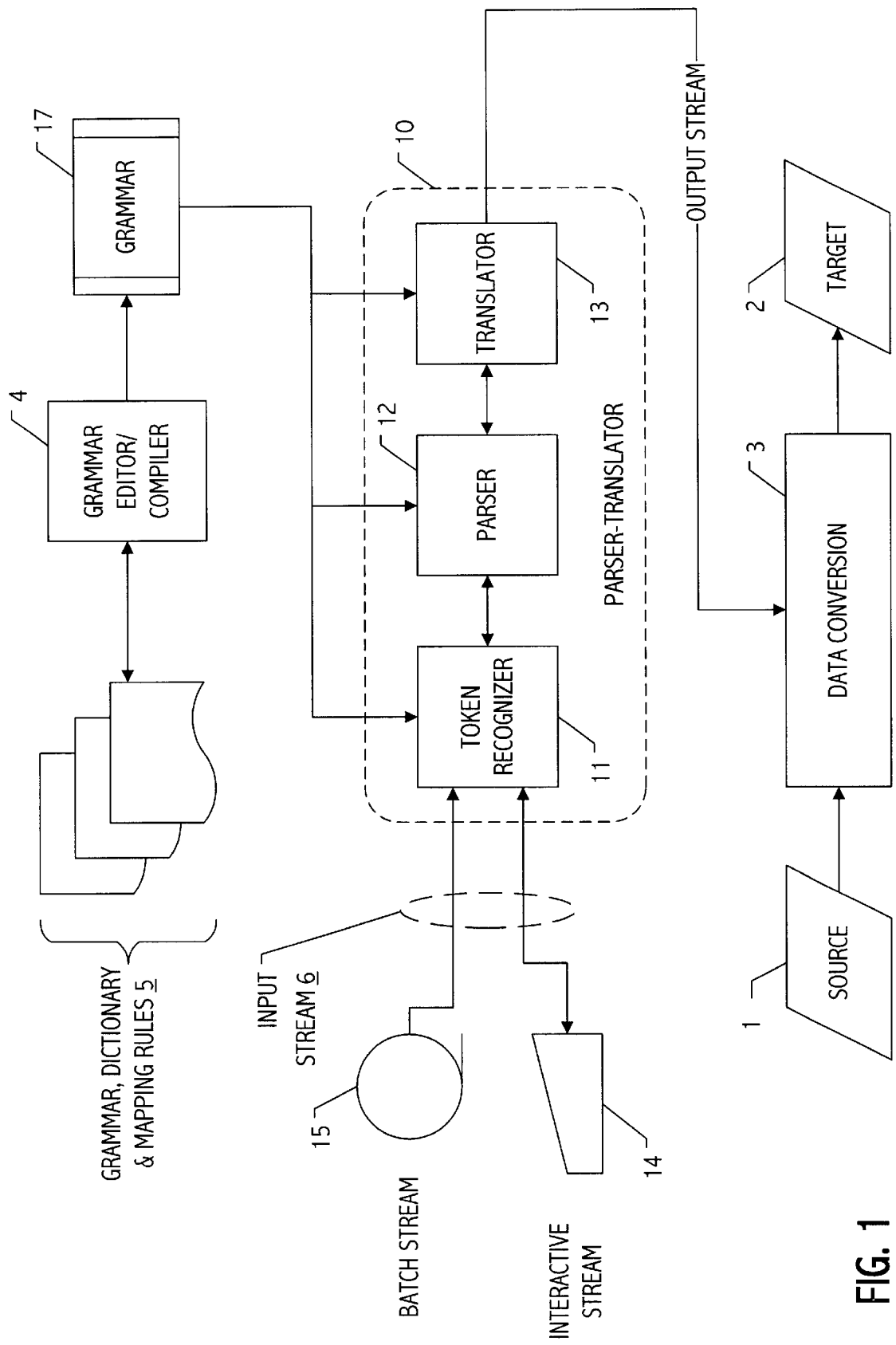
FIG. 1 is a block diagram depicting use of a parser-translator component in the context of a grammar-driven environment for specifying a data conversion and performing a mapping of aspects of a data source to a data target.

Some terminology used in this specification has meaning particular to the context of embodiments described herein. Therefore, to aid persons of ordinary skill in the art in understanding the full scope of the invention, some of that terminology is now defined.

Glossary

Access language: A programming language used to access a database, such as C, SQL, COBOL, or PL/I, Java or Visual Basic.

Access type: A data access method supported by the data access system (for example, navigational, single record, or database language).

Batch grammar: A grammar designed to receive input from a file. Contrast with interactive grammar. In some configurations, a single grammar can be used in both batch and interactive modes.

Batch mode: A mode in which a parser-translator gets its input from a non-interactive source such as a file. Contrast with interactive mode.

Candidates function: A user-defined function associated with a dictionary entry within a grammar. In an exemplary configuration, a candidates function is evaluated before a token recognizer attempts to match a token. A candidates function can be used to turn off or turn on a token for context sensitivity or to build a list of dynamic values for a menu. A candidates function can be used in conjunction with external query support as described herein.

Context sensitivity: Within the Parser, allows the use of an earlier value within the parse for subsequent effect in the parse.

Data access system: May be a database management system, a record-oriented file system, or a data exchange language. Examples include SYBASE™, IMS™, and DB2™.

Database: A set of semantically related record types stored in a data access system installation.

Data model: A framework for representation, storage, and manipulation of data. Examples include sequential, hierarchical, relational, network, object-oriented, and data exchange languages.

Dictionary entry: The description of a grammar terminal category that the Token Recognizer uses in matching tokens.

Expert token: A grammar dictionary entry (terminal) that, in an exemplary configuration, is specified to have an input value described as a string, integer, or fork. Each expert token may be constrained by some default parameter values, as well as by a validation function identified in the grammar. The input value may also be modified before being passed to the grammar translation functions.

Fork: A type of token that, in one grammar, references another grammar. When encountered, a fork causes a new parse to be invoked, and the value returned from that parse is used as a simple token in the calling grammar. Though non-essential, the use of forks can be useful to modularize a representation of a grammar. In this regard, forks are analogous to function calls in a programming language.

Grammar: A formal definition of the syntactic structure of a language typically represented as a set of rules that specify legal orderings of constituents and subconstituents (e.g., phrases and symbols) in properly formed statements (or sentences) in a language. One exemplary grammar encoding in accordance with the present invention includes (1) a set of phrase structure rules and associated translation rules that define the syntactic order of a source and target language, (2) a dictionary of entries that describes each terminal category in the grammar and (3) identifier(s) for one or more user functions that may be called to establish parse context, obtain candidate next parse states and/or validate tokens, e.g., by querying external stores.

Input Stream: A flow of information including tokens to be recognized and parsed. In some configurations, an input stream is part of a bi-directional information flow, such as between a parser-translator component and a user via a user interface. In other configurations, an input stream can be non-interactive, e.g., as supplied from a file. In general, an input stream may include information flows from a file, within a program, via an operating system construct such as a socket, pipe or STREAMS interface, communications medium, etc.

Interactive grammar: A grammar designed to display prompts and receive responses from responses from the user. Contrast with batch grammar. In some configurations, a single grammar can be used in both interactive and batch modes.

Interactive mode: A method of operation (mode) in which a parser-translator receives its input from responses from a user. Contrast with batch mode.

Nonterminals: Grammar categories that appear on a left-hand side (LHS) of a phrase structure rule. Also called rule names.

Parser: A functional subcomponent of parser-translator software responsible for parsing statements in a language (e.g., a programming language or a data definition or transformation language) or for providing a data-driven user interface (e.g., a menu-driven interface) in accordance with phrase structure rules of a grammar.

Phrase structure rules: The rules in a grammar that indicate the legal sequences of tokens allowed by the language described. In one exemplary representation described herein, phrase structure rules encode descriptions of sequences of terminals and/or nonterminals that can be used to replace a nonterminal in accordance with a grammar for a particular language.

Rule name: The nonterminal grammar category that is on the left-hand side of the arrow in an exemplary representation of a phrase structure rule.

Rule specification: For a rule, indicates a legal sequence of tokens allowed by the programming language described.

Schema: The description of the record definitions and the inter-record relationships found in a particular database.

Semantics: The meaning of a phrase in a language, as opposed to syntax which describes how symbols may be combined independent of their meaning.

Syntax Rules: Rules that describe the structure of legal statements in a language. A language's syntax is described by a grammar.

Terminal: Grammar category that occurs only on the right of the arrow in a typical expression of a phrase structure rule. Dictionary entries are created for terminals.

Token: An instance of a grammar category in the input stream being parsed.

Token recognizer: A functional subcomponent of a parser-translator responsible for recognizing the tokens, from either an input file or a menu.

Translator: A functional subcomponent of a parser-translator responsible for mapping a parsed phrase to an output representation thereof. In an exemplary configuration, particular mappings (or translations) of tokens to outputs are encoded in corresponding dictionary entries of a grammar to facilitate piecewise translations of a parsed phrase. In some configurations, translation rules may be associated with phrase structure rules of a grammar.

Translation function: A user-defined function associated with a phrase structure rule of a grammar for supplying a translation of a parsed phrase. In an exemplary configuration, a translation function is evaluated after tokens have been recognized and matched to complete a phrase in accordance with a phrase structure rule of a grammar.

Validation function: A user-defined function associated with a dictionary entry in a grammar for validation of a matching token. In an exemplary configuration, a validation function is evaluated after a token has been recognized and can be used to provide data validation at that time.

Exemplary Data Conversion System Including a Parser-Translator

FIG. 1 depicts an exemplary data conversion system employing a parser-translator to at least partially define a specific source-to-target data conversion in accordance with a grammar encoding legal statements in a data transformation language. Typically, components of such a parser-translator and, more generally, of systems employing such a parser-translator facility, are encoded as software instructions executable on a computer (not shown). In the embodiment of FIG. 1, both batch and interactive streams of tokens are illustrated. At a given time, implementations will typically be configured to parse and translate either a stream of tokens interactively supplied by a human user interacting with user interface 14 or a set of tokens represented in storage 15 and processed by parser-translator 10 in batch mode. In the interactive mode, parser-translator 10 advantageously supplies a human user with one or more next possible choices consistent with a current parse state and the set of legal statements encoded by grammar 17.

Referring to FIG. 1, parser-translator 10 includes three sub-components: token recognizer 11, parser 12 and translator 13. Persons of ordinary skill in the art will recognize that boundaries between one sub-component and another are somewhat arbitrary and that, based on the description herein, a variety of decompositions of parser-translator functionality are consistent with the spirit and scope of the present invention. Thus, FIG. 1 merely presents an illustrative decomposition useful for describing some functionality typical of parser-translator designs in accordance with the present invention and should not be taken as limiting. In view of the foregoing, parser-translator 10 receives an input stream 6 from which token recognizer 11 extracts tokens in accordance with dictionary entries and rules encoded in grammar 17 and in accordance with a current parse state. Tokens extracted from input stream 6 are supplied to parser 12 and are used to update the current parse state. Once the current parse state includes a complete phrase as defined by the rules encoded in grammar 17, translator 13 provides a translation. Rules describing the particular translations to be performed are likewise encoded in grammar 17.

A translated output stream is supplied by parser-translator 10 to define the particular data transformations to be performed on source data received from source 1 by data conversion component 3. Data conversion component 3 supplies transformed source data to target 2. Although source 1 and target 2 are typically distinct source and target databases, and although target 2 is often a database created to be populated with transformed data from a source database, other configurations are also suitable. For example, in a data cleansing configuration, source 1 and target 2 may be the same database. Alternatively, source 1 may include data content of one or more operational systems and target 2 may be a data warehouse for representing an image of operational data for use by downstream applications or for decision support applications. Furthermore, source 1 and/or target 2 may be representative of multiple stores from which data is received and to which transformed data is supplied.

Parser-translator 10 allows a user to interactively define transformations from source 1 to target 2. Because the particular transformations are defined using a grammar (e.g., grammar 17) that encodes the universe of legal transformation statements, the user is constrained to define legal transformations. In this way, data transformations defined using parser-translator 10 are correct by construction. Furthermore, because the grammar (e.g., grammar 17) also encodes rules for translating phrases defined by the user in accordance with phrase structure rules of the grammar, the user can be insulated from the data access idiosyncrasies of source 1 and target 2. In short, the user can focus on the semantics of the desired transformations and need not be concerned with the proper syntax of query or populate statements for a particular data access system, access language or database installation. If filtering, sorting, combining, joining and/or other operation(s) is (are) to be performed on data represented in a source database or intermediate data store, the user can similarly focus on the semantics of the desired transformations and need not be concerned with the proper syntax of statements. An exemplary grammar is described in greater detail below.

In the embodiment of FIG. 1, grammar 17 is typically defined by a sophisticated user using a grammar tool 4 to edit and encode the rules employed by parser-translator 10 to guide a potentially less sophisticated user in the definition of a data transformation. In general, grammar 17 includes a set of phrase structure rules that encode the set of legal statements in a particular language and a set of dictionary entries that encode information associated with tokens. In one configuration in accordance with FIG. 1, user edits to a source representation of a grammar are compiled to produce a compiled grammar for use by parser-translator 10. Nonetheless, other parser-translator configurations may use alternative, e.g., uncompiled, grammar representations.

A variety of token recognizer 11, parser 12 and translator 13 designs are suitable. As a general matter, one class of suitable designs is based on so-called "left corner" algorithms such as that described in Kenneth M. Ross, *An Improved Left-Corner Parsing Algorithm*, COLING 82, North-Holland Publishing Company (1982). One particular design including support for context-sensitive prompting and external queries is described in greater detail below with reference to FIGS. 4–12. Nonetheless, based on the description herein, persons of ordinary skill in the art will appreciate a wide variety of suitable alternatives.

Referring to FIG. 1, token recognizer 11 examines the input stream, which comes from a file or from a menu selection. It matches the input stream against a set of tokens encoded in grammar 17, which represent the next legal choices in the grammar. Because token recognizer 11 accepts a token only if it matches a legal choice at that point in the grammar, the parser 12 does not need to include back-tracking or error-recovery logic. Parser 12 accepts tokens from token recognizer 11. Using translator 13, parser 12 builds an internal representation of the translation of the input stream according to translation rules encoded in the grammar. If parser 12 receives more than a single token at a time, it recognizes that more input is needed before it can decide which grammar rules (and translation rules) apply. Parser 12 then creates and maintains multiple representations for the input stream read so far until the ambiguity can be resolved and a single representation selected.

A Parser-Translator Component with Dynamic Query Support

Figure 2:
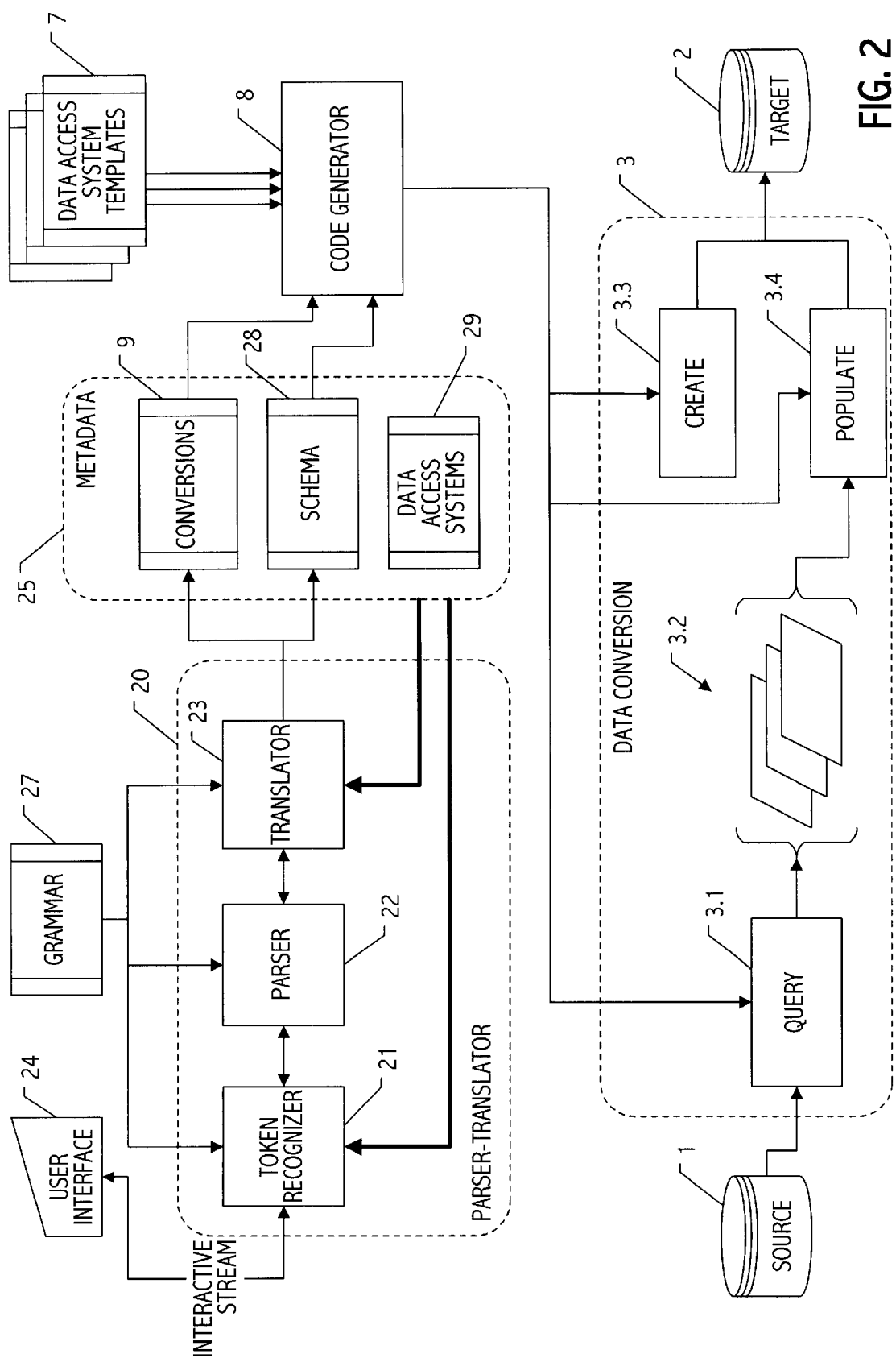
FIG. 2 is a block diagram depicting the utilization of metadata by a parser-translator in accordance with an exemplary data conversion embodiment of the present invention, wherein the parser-translator includes facilities for querying metadata in the course of interactive specification, by a user, of a conversion in accordance with a predefined grammar.

As described above, one advantage of parser-translator configurations and grammars in accordance with embodiments of the present invention is an ability to interface dynamically with other systems and/or repositories to query for information about objects, systems and states represented therein, as well as their respective interfaces. FIG. 2 illustrates a data conversion system employing a parser-translator component 20 wherein the information queried by token recognizer 21 and translator 23 subcomponents includes metadata 25. In general, token recognizer 21 and translator 23 may query schema information 28 descriptive of source database 1 and target database 2, conversion information 9 descriptive of mappings between the databases and fields therein, as well as data access systems themselves, e.g., data access system 29 representing source database 1 and target database 2.

In the illustrative configuration of FIG. 2, results of parser-translator 20 operation are stored as part of metadata 25, i.e., as conversion information 9 and schema information 28, for use by code generator 8 in supplying data conversion environment 3 with query 3.1, create 3.3, and populate 3.4 programs. Together, these programs perform the data conversions specified by a user using parser-translator 20 in accordance with grammar 27. As will be appreciated by persons of ordinary skill in the art based on the description herein, such storage organizations and application environments are merely illustrative and parser-translator configurations and grammars in accordance with some embodiments of the present invention allow parser translator components to be utilized as front-ends for a wide variety of software tools.

Figure 13:
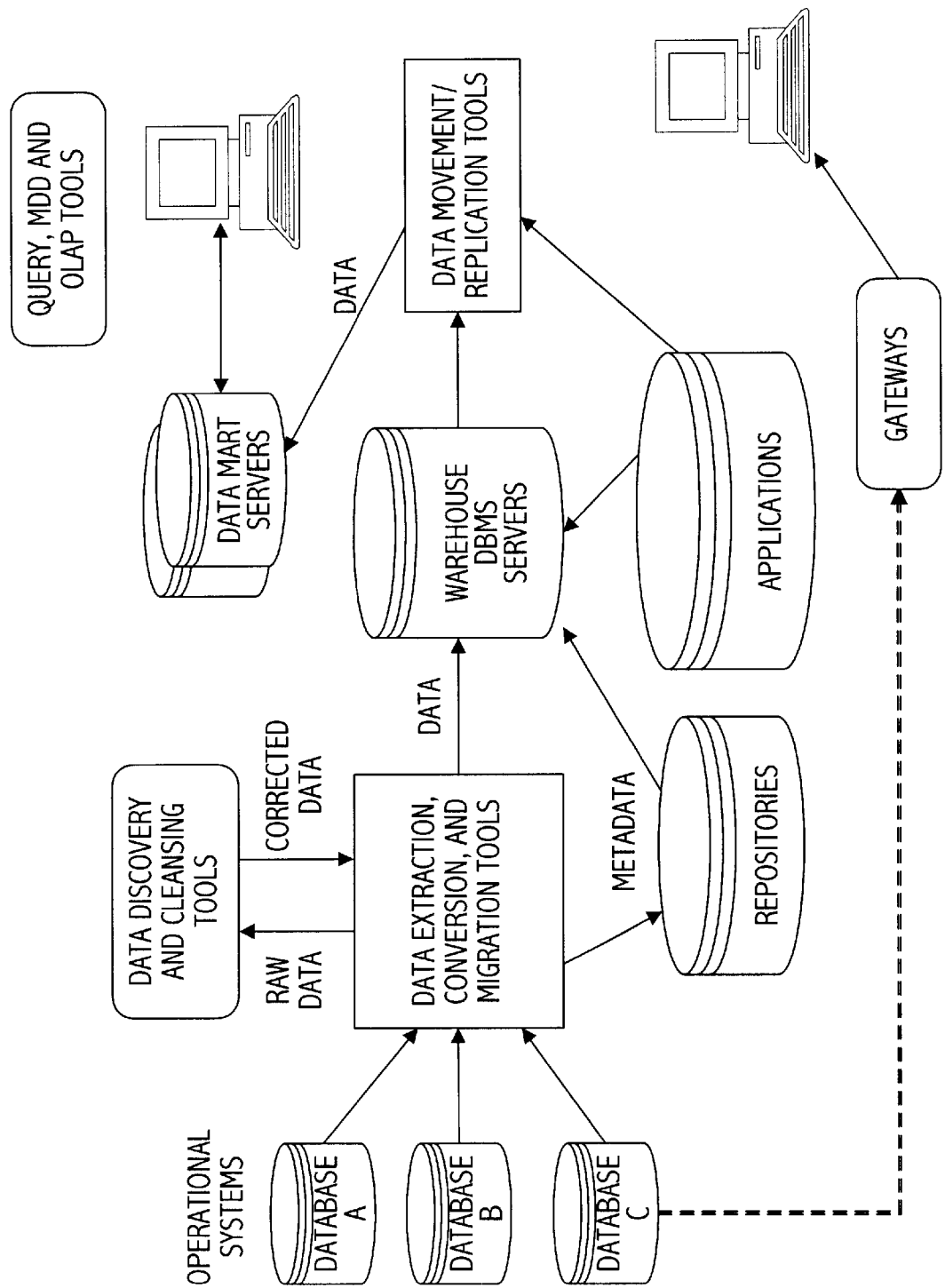
FIG. 13 depicts an illustrative enterprise tools environment including data discovery and cleansing tools, data extraction conversion and migration tools, data movement and replication tools, query MDD and OLAP tools, as well as applications and gateways that may advantageously incorporate parser-translator components in accordance with exemplary embodiments of the present invention.

By encoding external query function identifiers in a grammar and providing support in a parser-translator component for invoking such external queries, a single parser-translator component can be provided that is readily customizable for use in multiple software tool environments to facilitate business rule interchange. By sharing the same context-sensitive grammar framework, vendors can define a subset of a natural language to be used in specifying business rules in such a way that enterprise tools from various vendors and targeted at various data access or decision support functions may freely exchange such business rules. FIG. 13 depicts an illustrative enterprise tools environment including data discovery and cleansing tools, data extraction conversion and migration tools, data movement and replication tools, query Multi-Dimensional Data (MDD) analysis and On-Line Analytical Processing (OLAP) tools, as well as applications and gateways that may advantageously incorporate a parser-translator component. By supplying vendor- or tool-specific translation rules and environment-specific external query handlers, a single context-sensitive grammar framework can be used to define business rules that may be used by a multiplicity of tools incorporating such a parser-translator component.

Figure 3:
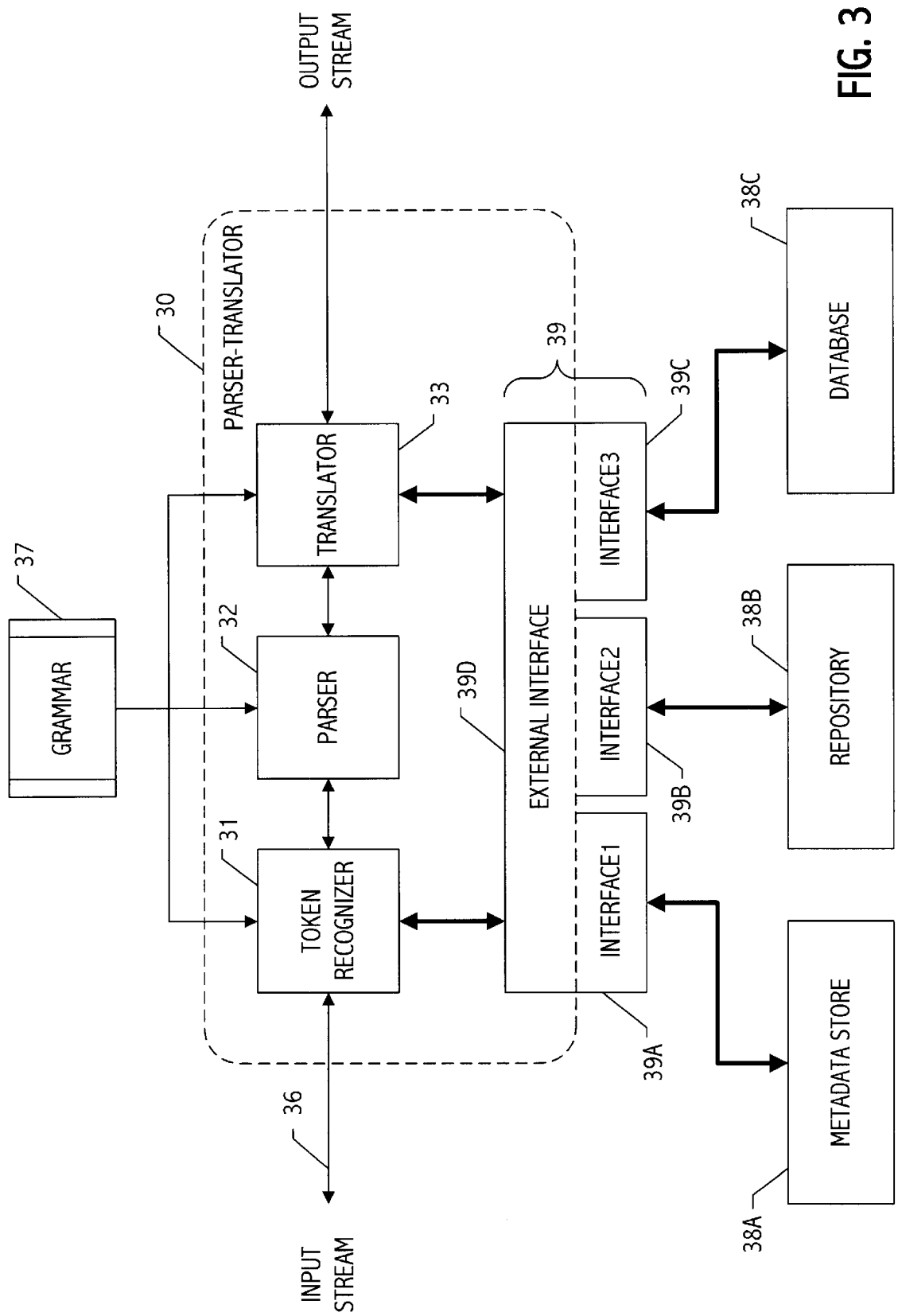
FIG. 3 is a block diagram depicting the interaction of a parser-translator configured in accordance with an exemplary embodiment of the present invention to allow dynamic querying of external stores of metadata in the course of a grammar-driven specification of a data source to data target mapping.

FIG. 3 depicts an illustrative parser-translator component 30 suitable for use in a variety of software tool environments to parse a stream of tokens in accordance with a grammar (e.g., grammar 37). As with parser-translator 10, parser-translator component 30 receives an input stream from which token recognizer 31 extracts tokens in accordance with dictionary entries and rules encoded in grammar 37 and in accordance with a current parse state. Tokens extracted from the input stream by token recognizer 31 are supplied to parser 32 and are used to update the current parse state. Once the current parse state includes a complete phrase as defined by phrase structure rules encoded in grammar 37, translator 33 provides a translation. Rules describing the particular translations to be performed are likewise encoded in grammar 37. In an exemplary configuration, a parse state, such as that maintained by parser-translator component 30, maintains a representation of tokens selected so far, of a current position within the grammar rules, and of the translations of tokens and/or phrase structure rules completed so far. However, parse state representations for other configurations may include more, less or different information as appropriate for a particular implementation.

In certain embodiments, parser-translator component 30 is operable in both interactive and batch operating modes. In the interactive mode, the input stream includes a bidirectional information flow in which a user specifies data transformations to be performed. Parser-translator component 30, particularly the parse state maintained by parser 32, constrains the choices available to the user in this interactive specification process in accordance with phrase structure rules encoded in grammar 37.

Some of these user choices are explicitly coded in grammar 37 in the form of dictionary entries that, given a particular parse state, identify suitable next tokens in a phrase consistent with the phrase structure rules of the grammar. Further choices may be identified or existing choices constrained using queries to external data sources. Such queries are likewise encoded in grammar 37 and in an exemplary embodiment thereof, are encoded using candidates and/or validation function identifiers associated with dictionary entries. The provision of external query support is particularly advantageous because it allows parser-translator component 30 to decouple intimate knowledge of the data sources to be queried from the code implementing parser translator component 30. In this way, a single parser translator component 30 can be used in multiple software tool environments with the same or different grammars.

External queries encoded in a grammar (e.g., grammar 37) by candidates function identifiers or as validation function identifiers are initiated by token recognizer 31 via external query interface 39. External query interface 39 advantageously includes a portion internal to parser-translator component 30 and a portion or portions respectively associated with particular external stores, such as repositories, databases or files. For example, in the embodiment of FIG. 3, an internal portion 39d is callable by (or otherwise responsive to) token recognizer 31 and provides a defined interface to parser-translator 30 context (e.g., variables, parse state, etc.), while three external portions 39a, 39b and 39c are respectively associated with external stores. For example, external portion 39a is associated with metadata store 38a. The three external portions of FIG. 3 are merely illustrative and embodiments in accordance with the present invention may include one or more external portions to perform any one or more of the external query functions described herein.

The interface between internal portion 39d and external portions 39a, 39b and 39c may be of a variety of suitable designs including using a Tool Control Language (TCL) interface, a scripting language interface such as PERL, Visual Basic, a Java™ interface (JAVA is a trademark of Sun Microsystems, Inc.), a functional interface such as provided by a library module (e.g., a dynamically-linked library or DLL) or other software object, etc. Whatever the form, the interface between internal portion 39d and external portions 39a, 39b and 39c allows an external portion to be customized to the access requirements of a particular external store, repository or database. In the embodiment of FIG. 3, three representative stores are depicted, namely metadata store 38a (e.g., an ETI-EXTRACT metadata store), repository 38b (e.g., Microsoft's repository), and database 38c providing access to information about objects, systems and states represented therein.

Without limitation, exemplary exploitations of external interface 39 include the following: (1) performing, in the context of a user specification of a business rule, a grammar driven query to a metadata store representing information about a database (or to the database itself) to identify a set or subset of relations or fields currently represented in the database and supplying results of such a query to the user as choices for adding to the business rule specification; and (2) qualifying a user selection, which is consistent with the phrase structure rules of the grammar, against data or metadata represented external to parser-translator component 30. In the embodiment of FIG. 3, translator 33 may also initiate external queries.

As described above, parser-translator component 30 is suitable for incorporation in a variety of software tool environments for which defining data transformations (e.g., the test and transformation logic of business rules) in a natural language-style dialog with a user is a desired feature. Such software tool environments include data cleansing and discovery tools, data extraction, conversion and migration tools, data movement and replication tools (e.g., to support data warehouses and data marts), query and on-line analytical processing tools, gateways to operational data systems, Computer Aided Software Engineering (CASE) tools, enterprise resource planning applications, etc. In general, parser-translator component 30 provides a software tool with functionality for guiding a user through the specification of complex statements in a user language by presenting available options consistent with a grammar defining the structure of the user language and consistent with the structure and state of data objects and systems. In this way, user language statements are correct by construction, phrased in the user language, and appropriate to the environment for which they are defined. Furthermore, the translation functionality of parser-translator component 30 provides the capability of translating the now properly formed user language statements to the form and syntax desired by a specific software tool.

Therefore, by defining the behavior of parser-translator component 30 using a grammar (e.g., grammar 37) descriptive of the universe of legal statements in the user language, by defining tool-specific translation rules, and by defining data environment specific external query handlers callable using identifiers encoded in the grammar, a parser-translator component implemented in accordance with the present invention can be used to provide a natural language dialogue facility in a wide variety of software tool environments. Furthermore, by operating in a batch mode with multiple instances of such a parser-translator component, each configured with a grammar encoding translation rules suitable for the associated software tool, a single set of interactively defined business rules may be exploited by disparate software tools. Advantageously, parser-translator component and grammar facilities in accordance with the present invention provide a framework for multi-tool, multi-vendor exchange of business rules. Context sensitivity during batch mode operation is provided, as before, by external query support initiated in accordance with grammar encodings.

Grammar-Based Specification of a Language

In general, a grammar includes formal definition of the syntactic structure of a language typically represented as a set of rules that specify legal orderings of constituents and subconstituents (e.g., phrases and symbols) in properly formed statements (or sentences) in a language. Although a variety of suitable representations and encodings of a grammar are suitable, one exemplary encoding for a grammar representation such as grammar 37 is now described. Based on this description, persons of ordinary skill in the art will appreciate a variety of alternative representations and encodings. The behavior a parser-translator component in accordance with some embodiments of the present invention (or of a software tool integrating a parser-translator component in accordance with some embodiments of the present invention) is in part defined by a grammar such as described herein. Furthermore, a grammar in accordance with the present invention, such as the exemplary grammar now described is itself functionally descriptive and, when encoded in a computer readable medium (or media) may fall within the scope of some of the appended claims.

A grammar encoding in accordance with an exemplary embodiment of the present invention includes four components:

1. A set of phrase structure rules that describe the legal ordering of tokens in a language. For example, a Structured Query Language (SQL) grammar encoding may stipulate that SQL permits a statement such as "Select . . . where . . . " but does not permit a statement such as "Where . . . Select . . . ";
2. A set of dictionary entries that describe all the tokens that a parser-translator (e.g., token recognizer 31 of parser-translator component 30) should recognize;
3. A set of mapping rules that indicate how a sequence of tokens should be translated by the parser-translator (e.g., by translator 33 of parser-translator component 30); and
4. Optional function identifiers to identify to the parser-translator (e.g., to token recognizer 31 and/or translator 33 of parser-translator component 30) candidates, validation and/or translation functions. In some embodiments in accordance with the present invention, candidates, validation and/or translation function identifiers are used to encode queries to external data stores (e.g., to metadata store 38a, repository 38b and/or database 38c).

The subsections that follow further describe exemplary encodes for each type of component.

Phrase Structure Rules

A phrase structure rule includes of two parts: the name of the rule and the rule specification. Consider the following rule:

A→B c D

Here the symbol A is the name of the rule, and the symbols B c and D form the specification of the rule. The name appears on the left-hand side of the rule, and the specification on the right-hand side. The name of the rule is always a nonterminal; a nonterminal is a part of the rule that can be expanded, as A here is expanded to B c D. A nonterminal symbol serves as the name of at least one rule. Sometimes the word nonterminal is used synonymously with rule.

A rule specification can include both nonterminals and terminals; a terminal is a part of the rule that can't be expanded (and therefore can't ever serve as the name of a rule). Both terminals and nonterminals are referred to as grammar categories. In this example, the uppercase characters B and D represent nonterminals, and the lowercase c represents a terminal symbol. The naming convention used herein is that nonterminals appear in uppercase, terminals in lowercase. Grammar categories in a rule specification are separated by spaces.

A rule specification includes a sequence of grammar categories that define a legal sequence (or sequences) of tokens in the language. Tokens (read from the input stream) "match" categories. This notion of "matching" is clarified in the examples that follow.

Dictionara Entries

A dictionary entry describes the tokens that match a terminal. Each terminal referred to in a rule specification should have at least one corresponding dictionary entry, and it may have more than one dictionary entry associated with it.

An exemplary grammar in accordance with the present invention can include three types of dictionary entries: (1)

entries that describe regular tokens, (2) entries that describe expert tokens and (3) entries that describe fork tokens. A regular token is a fixed sequence of characters (for example, the string "delete"). An expert token is a string whose value cannot be specified when the grammar is written but which can be defined in terms of its characteristics. An expert token receives its value from the user, and the grammar imposes restrictions on the type of value accepted. For example, an expert token might be defined as an even number. A token recognizer such as token recognizer 31 provides a fairly rich set of mechanisms for statically specifying the characteristics of an expert token. However, these mechanisms can be augmented by encoding function identifiers (described below) to provide context sensitivity, for example by querying external stores.

A fork token is a terminal represented in the statement by a value produced by the parse state of a subgrammar to be invoked. In an exemplary grammar encoding, subgrammars can be defined and a new grammar can be invoked by designating a terminal in the calling grammar as a fork entry. This capability is especially helpful when the language described is very complex.

Mapping (or Translation) Rules

In an exemplary grammar encoding in accordance with the present invention, each expansion of a rule has an associated translation rule that specifies how the sequence of input tokens matching the rule expansion should be translated, or mapped. In an exemplary configuration, three options for translating a rule expansion are provided: (1) concatenate with blanks, (2) concatenate without blanks and (3) translate using an expression.

The concatenate with blanks option directs translator 33 to concatenate the translations of each token in the sequence of tokens that match the rule, separating translations with a blank. For example, suppose the following rule is specified:

SPECIFY-IN-SET→data-value (SPECIFY-IN-SET)

where data-value is an expert token and the parenthesis indicate an optional element. Assume also that the input tokens 1234 and 456 match this rule. The translations of the input tokens are 1234 and 456, respectively. Since an expert token translation is the same as the input it matches unless it is changed by a validation function (see below) the translation is as follows:

1234 456

The concatenate without blanks option directs translator 33 to concatenate the translations of each token in the sequence of tokens that match the rule. For the previous example, the output would look like this:

1234456

Finally, if the translate option is selected, a string expression is specified which represents the desired translation using the grammar category name enclosed in angle brackets wherever the translation of the input tokens matching a terminal or nonterminal is to occur in the translation. For example, in the case of a grammar for a menu-driven interface for manipulating a file, a grammar rule could be:

RULE1→delete pathname-expert

Where delete is a regular token matching the string delete in an input stream such as input stream 36. An appropriate translation for a UNIX target environment could be specified as:

rm <pathname-expert>

In an exemplary configuration, a grammar editor such as grammar tool 4 creates a template translation with a slot where <pathname-expert>occurred. Then, at evaluation time translator 33 fills in the slot with the pathname specified by the user and parsed from input stream 36. For example, if token recognizer 31 in conjunction with parser 32 determines that the string "/usr/extract/testing" in input stream 36 matches the pathname-expert token, the translation by translator 33 is as follows:

rm /usr/extract/testing

Grammar Functions

Although a variety of mechanisms to encode grammar-based queries to external stores are possible, one exemplary mechanism builds on candidates function, validation function and translation function facilities described in greater detail below with reference to FIGS. 4–12. Candidates, validation and translation function identifiers are encoded in a grammar such as grammar 37 and in an exemplary encoding candidates and validation function identifiers are associated with expert tokens, while translation functions are associated with phrase structure rules. In each case, the encoded function identifier, which may take the form of a symbol table name, an index specifying a function number, a string encoding the name of a TCL or JAVA routine, a pathname to such a routine, etc., allows parser-translator component 30 (particularly token recognizer 31 and translator 33 subcomponents thereof) to invoke the corresponding candidates, validation or translation function in accordance with grammar 37.

Candidates Functions: A candidates function is a grammar function that is associated with a dictionary entry and is invoked before token recognizer 31 tries to match its input against that dictionary entry. Two types of candidates functions are exemplary. A first type can be used to turn paths on and off based on context criteria by removing a dictionary entry from the list of next legal tokens, while a second type can be used to assemble a list of legal values for an expert token. In either case, to perform the desired action, the candidates function may access internal context information such as the current parse state or internally represented metadata, or in accordance with some embodiments of the present invention, may query an external data store to obtain external context information. For example, the candidates function may query metadata descriptive of the structure, content or schema of a source or target database.

A candidates function of the first type can therefore be used to make a grammar context-sensitive; that is, to use external context information, to determine whether or not that token should be presented to an interactive user as a legal choice. For example, if an interactive user is specifying a data transformation for a data field that contains a string and the grammar includes data transformations for both numeric and string fields, there may be a candidates function that checks to see if the data field being transformed is numeric and, if not, turns off numeric token in the grammar.

An illustrative pseudocode representation of such a candidates function is as follows:

Get data field being transformed

Get data type of that data field (e.g., by querying the database representing the data field)

IF numeric

THEN return TRUE

ELSE return FALSE

A candidates function of the second type can be used to make the choices presented to an interactive user context-sensitive; that is, to use external context information, to build a list of values for an expert token. For example, if an interactive user is specifying a data transformation that references the value in another data field in the same record, a candidates function could return a list of the data fields in this data record.

An illustrative pseudocode representation of such a candidates function is as follows:

Get data field being transformed
    Get data record of that data field (e.g., by retrieving from an external metadata store)
    FOR EACH data field in the data record
        Add the name of the data field to a list return the resulting list Validation Functions: A validation function is associated with a dictionary entry and is invoked by token recognizer 31 after token recognizer 31 has successfully matched a token from input stream 36 against a terminal category. To perform the desired action, the validation function may access internal context information such as the current parse state or internally represented metadata, or in accordance with some embodiments of the present invention, may query an external data store to obtain external context information such as metadata descriptive of the structure, content or schema of a source or target database.

A validation function can therefore be used to make a grammar context-sensitive; that is, to use external context information, to validate an element received from input stream 36 and matched by token recognizer 31. For example, if an interactive user enters a value that will be used for comparison against the value in a data field, e.g., "IF the Sales Region is 'NW' THEN . . . ," a validation function may validate that the value entered by the user, e.g., the string 'NW', fits the data type of the field against which the value will be compared.

An illustrative pseudocode representation of such a validation function is as follows:

Get user-entered value
    Get data field compared against
    Get data type of that data field (e.g., by accessing schema information)
    IF user-entered value is consistent with that data type
        THEN return TRUE
        ELSE return FALSE Another example of validation function use to establish external context sensitivity is range validation. For example, salary level could be validated against a position-Patent dependent range (e.g., $20,000–$40,000) represented in an external store and accessed in accordance with a position identifier represented in the current parse state.

Translation Functions: A translation function can be used when the desired translation is a function of the particular tokens matched by token recognizer 31 and parsed by parser 32 consistent with the phrase structure rules of grammar 37. A translation function is associated with a phrase structure rule and is invoked by translator 33. To perform the desired translation, the translation function may access internal context information, may access the value of tokens matching the associated phrase structure rule, or in accordance with some embodiments of the present invention, may query an external data store to obtain information used in a translation.

A translation function can therefore be used to make a translation specified by a grammar context-sensitive; that is, to use external context information, to tailor the resulting translation. For example, if a particular data transformation involves reading a specified file (or other resource) for validation, that file may be represented by a logical name in the user's data transformation statement and needs to be resolved to an actual filename and path for the translated data transformation statement.

An illustrative pseudocode representation of such a translation function is as follows:

Get logical name from data transformation statement
    Query name space (e.g., DNS service) to resolve logical name
    Substitute resolved name for logical name in data transformation statement Invocation of candidates, validation and translation functions identified in a grammar such as grammar 37 is now described with reference to an exemplary embodiment of parser-translator component 30.

Operation of Illustrative Token Recognizer, Parser and Translator Subcomponents FIGS. 4–12 collectively depict a flowchart illustrating a sequence of operations for a parser-translator component having support for external queries. Operations are illustrated in the context of an interactive stream such as that provided by user interface (e.g., a menu-based or other bi-directional human-machine interface in which a user is offered context-sensitive choices). Nonetheless, modifications for batch operations on an input stream (e.g., in a batch operating mode of a parser-translator component or in a batch-only instance of a parser-translator component) will be appreciated by persons of ordinary skill in the art based on the description herein. As described above, boundaries between token recognizer, parser and translator subcomponents are somewhat arbitrary, and particular operations are illustrated in the context of subcomponents closely associated therewith in one illustrative embodiment. However, other allocations of functionality are envisioned and may fall within the scope of claims that follow.

Figure 4:
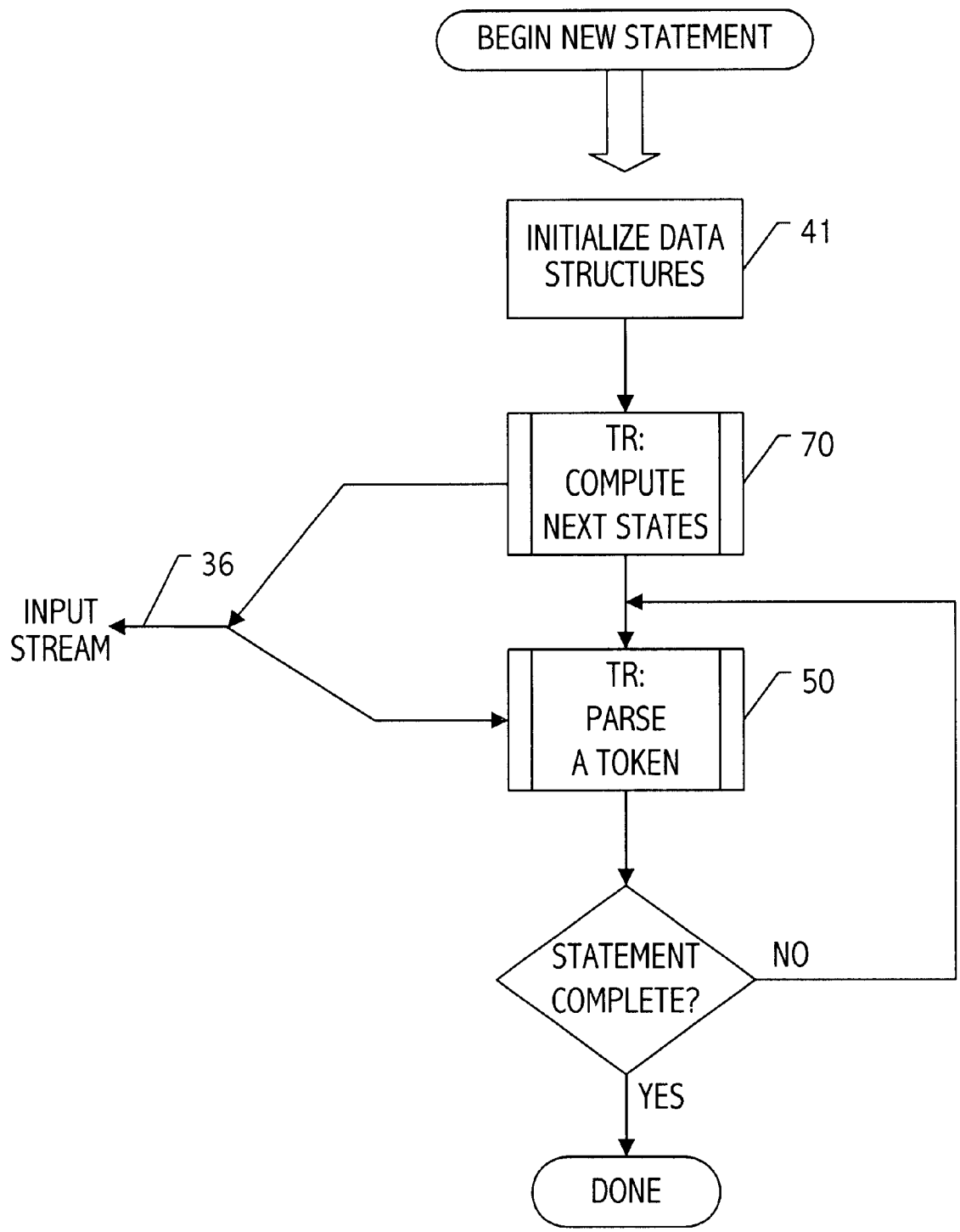
FIGS. 4–12 are a flow chart depicting a sequence of operations for a parser-translator component having support for queries to external metadata stores in accordance with an exemplary embodiment of the present invention.
Figure 7:
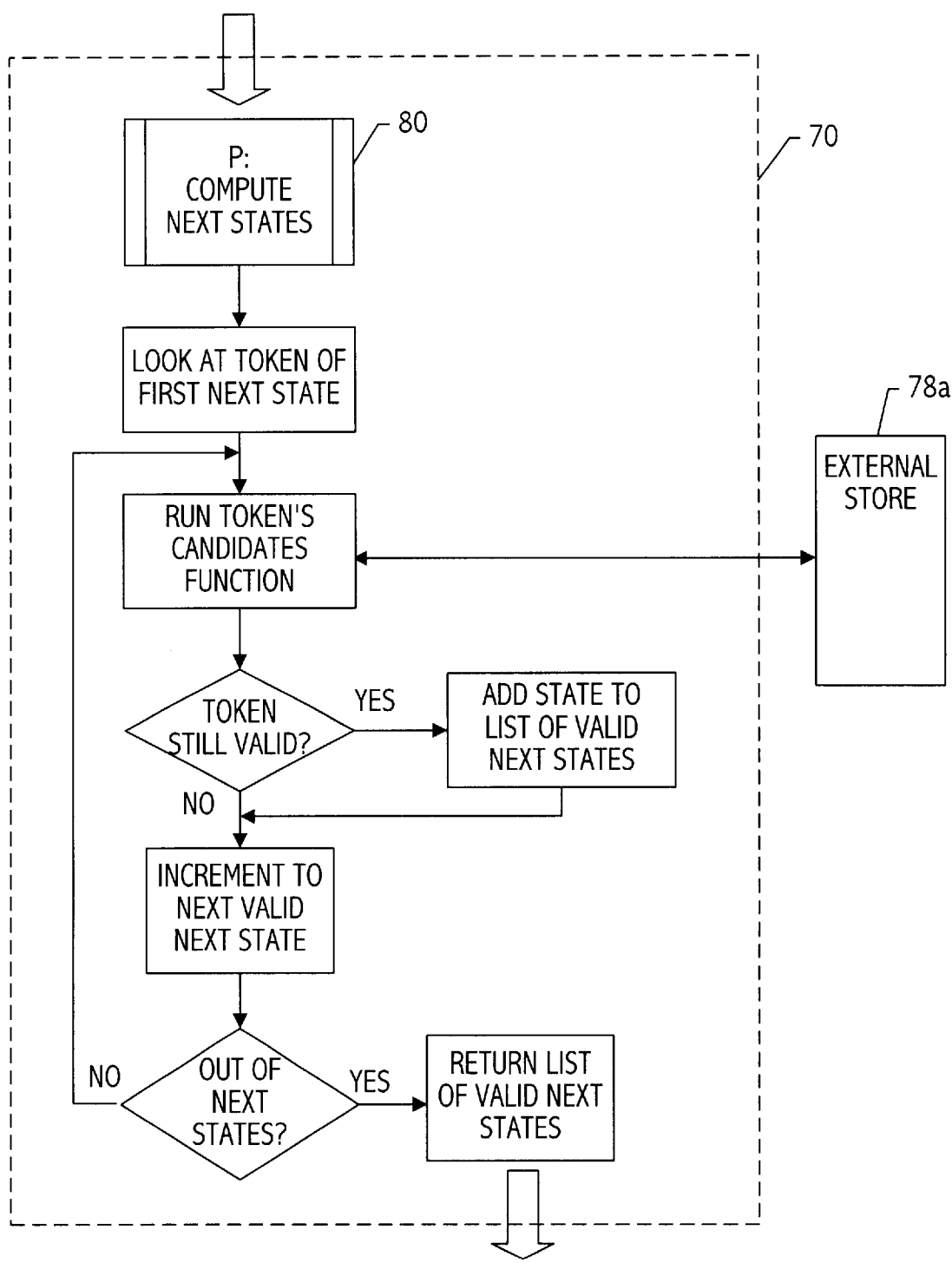

Referring now to FIG. 4, operation of a parser-translator component such as parser-translator component 30 begins with initialization 41 of internal data structures, including for example, parse state data structures and, optionally, internal representations of a grammar (e.g., of grammar 37). Token recognizer 31 computes a set of valid next states (operation 70) as depicted in FIG. 7 and as described in greater detail below. In general, the set of valid next states includes the set of next tokens consistent with a current parse state. After initialization 41, the set of valid next states includes those tokens that may begin a legal statement in the language defined by the grammar. For example, in embodiments of parser-translator component 30 integrated into a data transformation environment with an instance of grammar 37 encoding the syntax of legal data transformation statements, the set of valid next states includes those language elements or tokens that may begin a legal data transformation statement. Similarly, in embodiments of parser-translator component 30 integrated into programming environment with an instance of grammar 37 encoding the syntax of legal programming statements, the set of valid next states includes those language elements or tokens that may begin a legal statement in the programming language.

Figure 5:
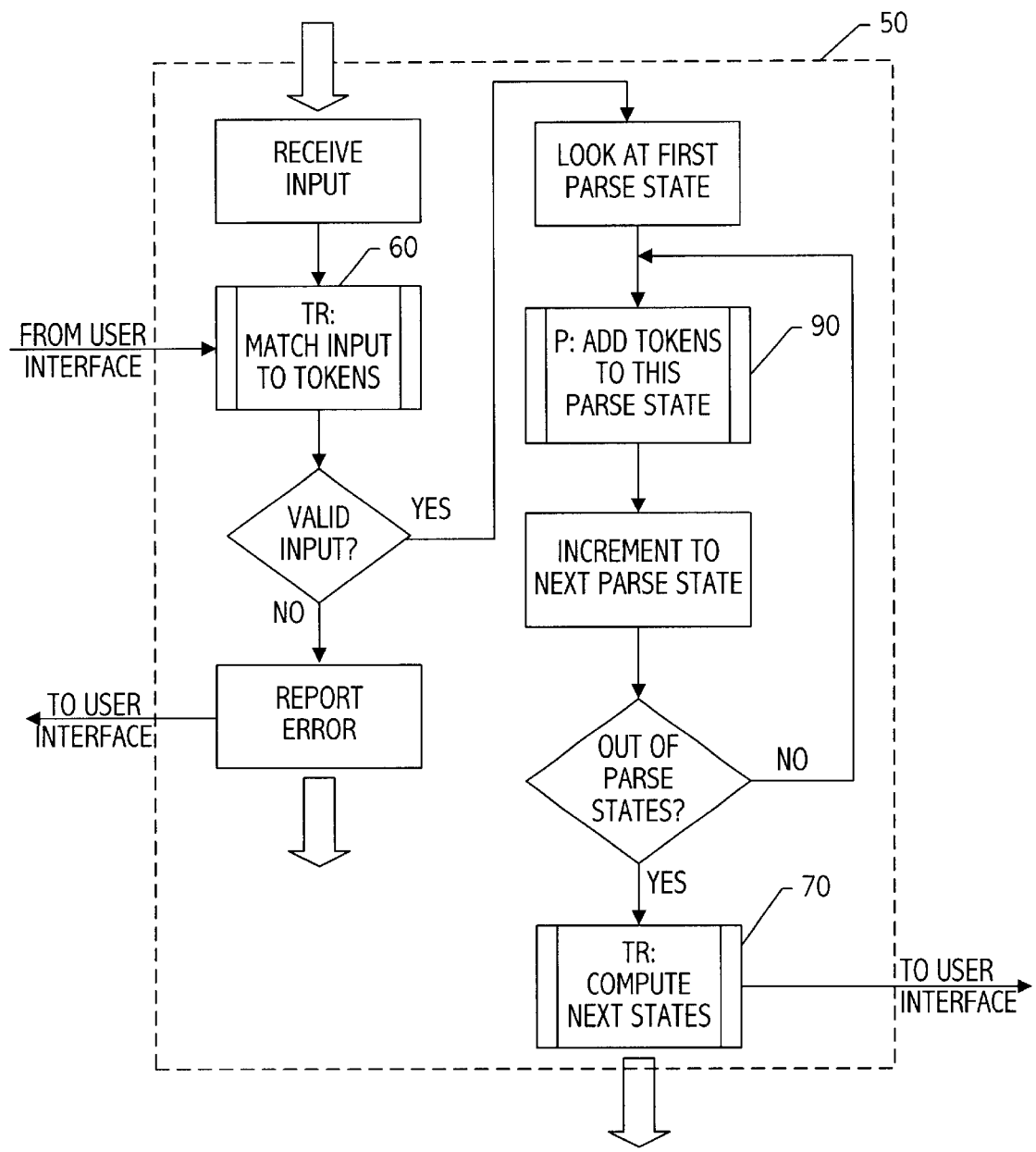

Based on the set of valid next states, token recognizer 31 causes a user interface (not shown) to present corresponding valid choices to a human user. In some embodiments, user interface presentation artifacts, e.g., menu text, is encoded in the grammar, although other encodings are also possible. Given a token received from the user interface (e.g., a menu entry selected by a human user), token recognizer 31 initiates the parsing 50 as depicted in FIG. 5 and as described in greater detail below. Additional tokens are parsed from the input stream (e.g., input stream 36) until a complete statement is defined in accordance with the particular grammar employed.

Figure 6:
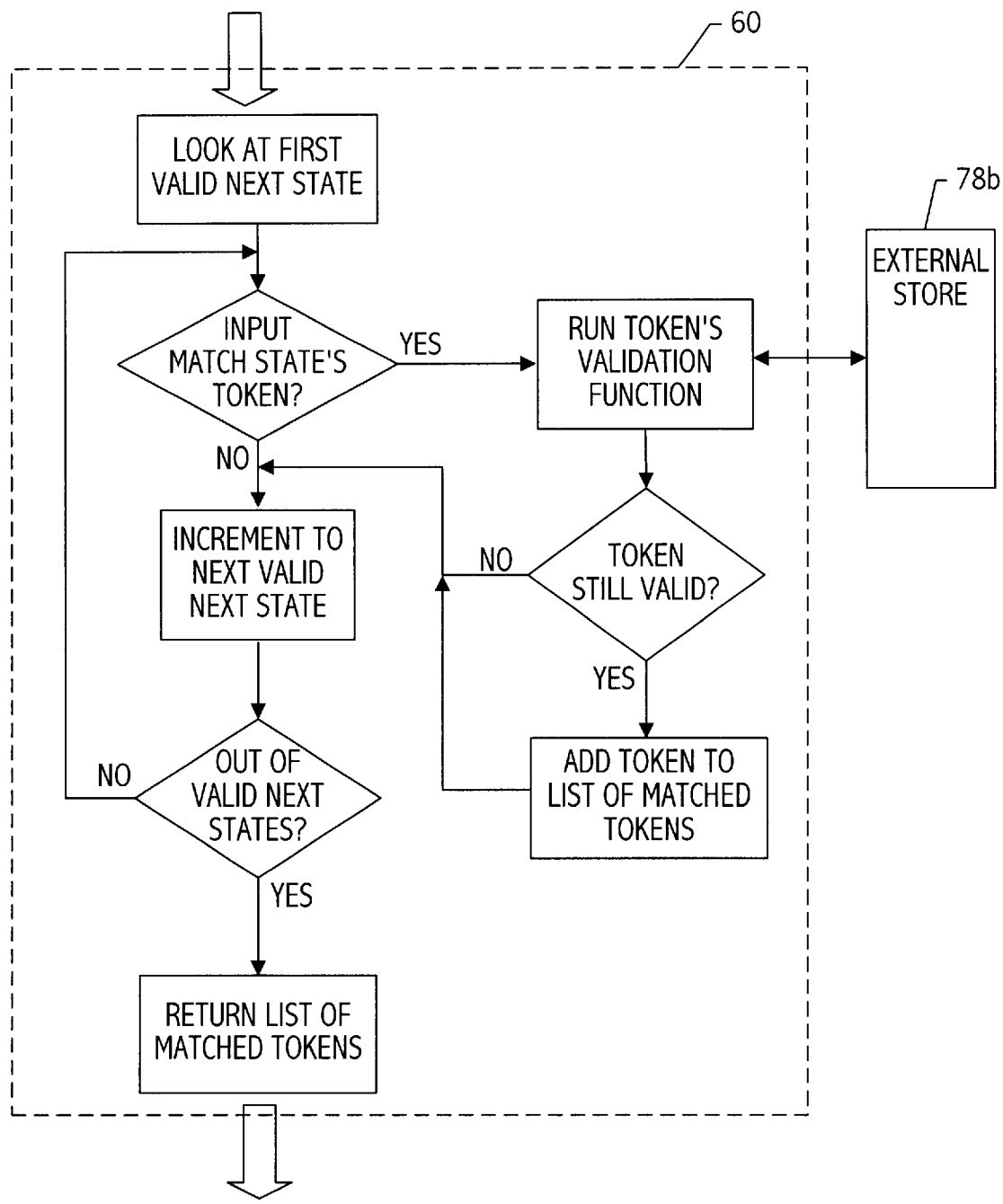

Referring now to FIG. 5, token recognizer 31 receives input (e.g., selections) from a user interface via input stream 36 and matches (60) that input to the set of valid next tokens as depicted in FIG. 6 and as described in greater detail below. If an input is invalid, an error may be reported via the user interface or by other mechanism such as a log file. Assuming a valid input, token recognizer 31 begins with a first parse state and invokes parser 32 to add (90) the recognized token(s) to the first parse state. As described above, parser-translator component 30 maintains multiple parse states corresponding to multiple representations for the input stream read so far until ambiguities can be resolved and a single representation selected. Therefore, token recognizer 31 also invokes parser 32 to add (90) the recognized token(s) to any additional parse states. Addition of recognized token(s) to parse states is described in greater detail below with reference to FIG. 9.

Figure 8:
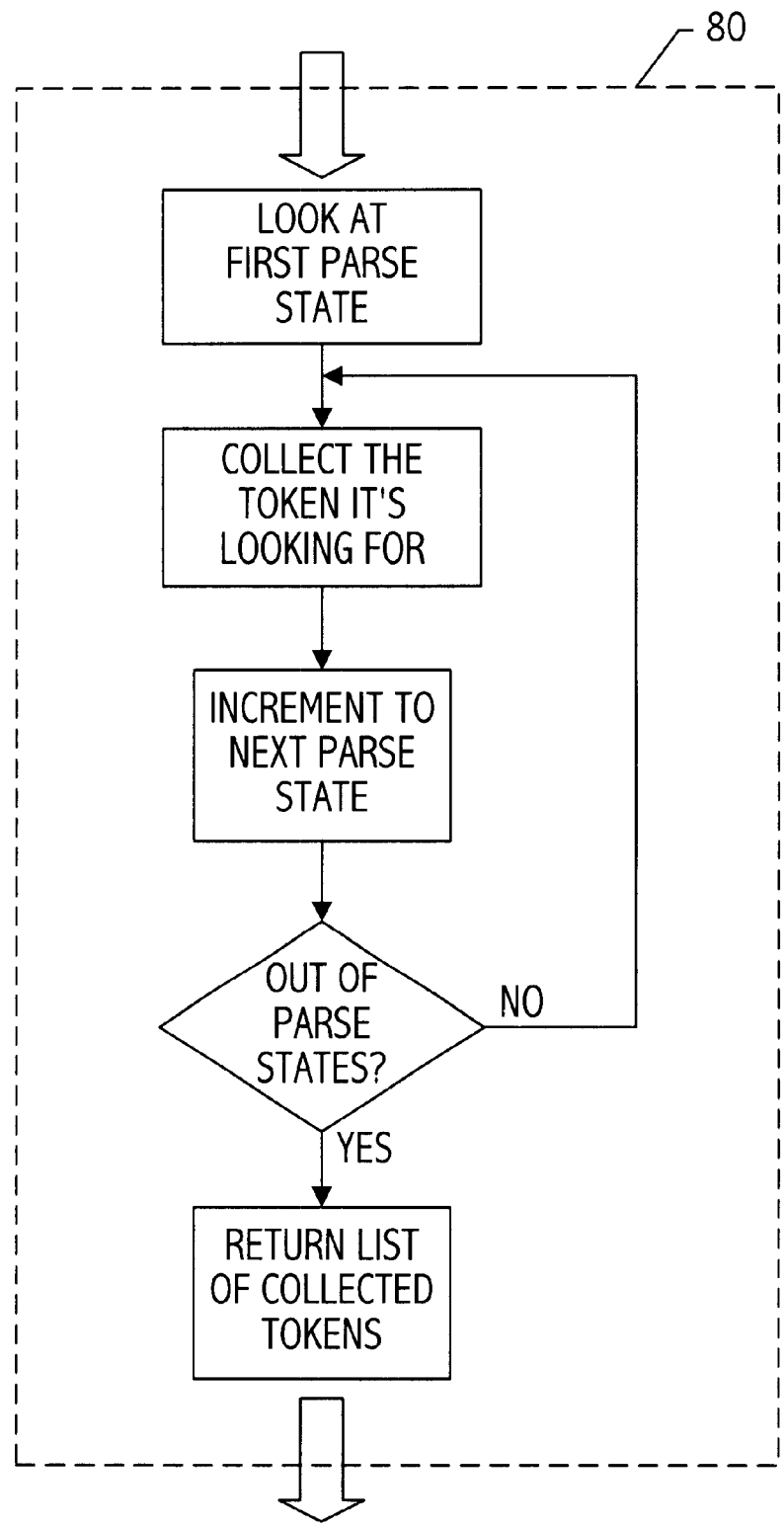

Once the recognized token(s) have been added to each of these parse states, token recognizer 31 computes (70) next states for each parse. As before, the set of valid next states returned by token recognizer 31 is supplied via the user interface to allow user selection of additional elements or tokens of a legal statement consistent with phrase structure rules encoded in grammar 37. Referring to FIG. 7, token recognizer 31 initially invokes parser 32 to compute (80) a list of potentially valid next states for each parse state maintained by parser 32. As illustrated in FIG. 8, parser 32 begins with a first parse state and, consistent with phrase structure rules encoded in grammar 37, collects those tokens that are potentially valid next states corresponding to the first parse state. Parser 32 also collects tokens that are potentially valid next states corresponding to the other parse states maintained by parser 32. Once parser 32 has collected a complete list of tokens consistent with potentially valid next states corresponding to all the parse states maintained by parser 32, parser 32 returns the list of collected tokens to token recognizer 31.

Referring again to FIG. 7, token recognizer 31 evaluates candidates functions (if defined in grammar 37) for each of the collected tokens. A candidates function may assemble a list of valid next states based on choices encoded therein or, in accordance with some embodiments of the present invention, may encode a query to an external data store 78a. In an exemplary embodiment of parser-translator component 30 integrated into a data transformation environment with an instance of grammar 37 having a dictionary entry corresponding to a particular collected token, a candidates function identifier associated with the token allows token recognizer 31 to invoke the identified candidates function to perform an external query. For example, the identified candidates function may obtain a current list of numeric fields represented in a database by querying a metadata store corresponding to the database or, in the case of a database environment that provides a functional interface to schema information, by querying the database environment itself. Suitable candidates function interfaces may return a code indicating whether a current token is valid or invalid. For example, a token may be invalid if no numeric fields are currently represented in the database. Suitable candidates function interfaces may also return a data structure (or pointer thereto) containing valid next choices based on query results. In any case, the next states computation (70) returns to its call site within token recognizer 31 (see FIGS. 4 and 5) and defines the set of next choices presented to a human user via a user interface.

Referring again to FIG. 5, token recognizer 31 matches (60) input selected by the human user interface against a set of valid next tokens. Matching is performed as illustrated in FIG. 6. For each valid next state returned by next states computation 70, the input is matched against corresponding token. If a match occurs, token recognizer 31 evaluates a validation function (if defined in grammar 37) for the matched token. A validation function may validate an input based on boundary values encoded therein or, in accordance with some embodiments of the present invention, may encode a query to an external data store 78b. External data stores 78a and 78b may be the same or different metadata stores, repositories or database environments.

In an exemplary embodiment of parser-translator component 30 integrated into a data transformation environment with an instance of grammar 37 having a dictionary entry corresponding to a particular matched token, a validation function identifier associated with the token allows token recognizer 31 to invoke the identified validation function to perform an external query. For example, the identified validation function may determine if user input falls within an allowable range of values for a particular database field by querying a metadata store corresponding to the database or, in the case of a database environment that provides a functional interface to schema information, by querying the database environment itself. Suitable validation function interfaces may return a code indicating whether a current token is valid or invalid. For example, a token may be invalid if the input value is out of range. Suitable validation function interfaces may also return a data structure (or pointer thereto) containing a valid value (e.g., a maximum, minimum or default value) based on query results. In any case, a matched token that has been validated is added to the set of matched tokens returned for further processing by token recognizer 31. Token recognizer 31 performs input matching against each of the valid next states corresponding to a parse state representation consistent with the input stream read so far.

Figure 9:
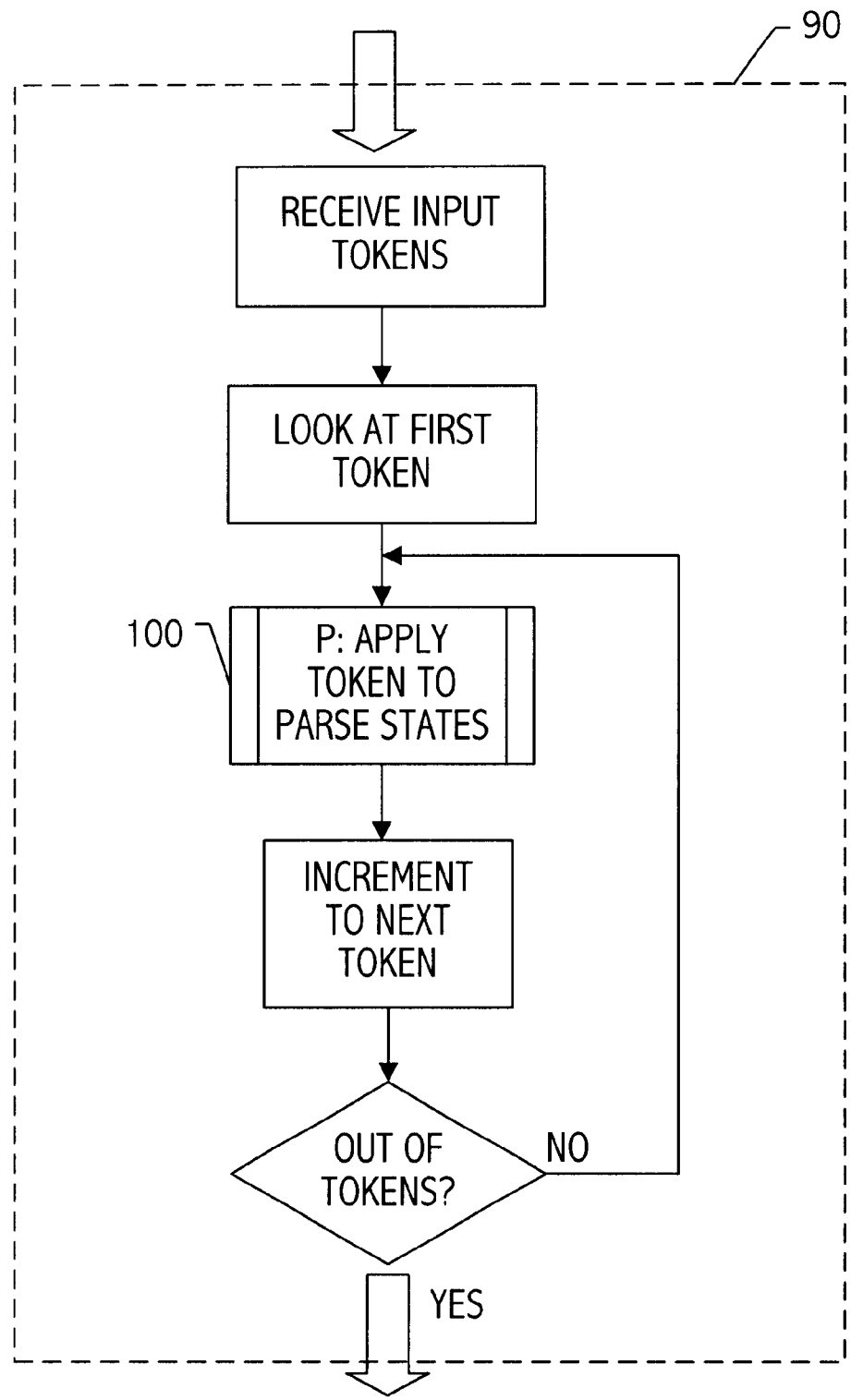
Figure 10:
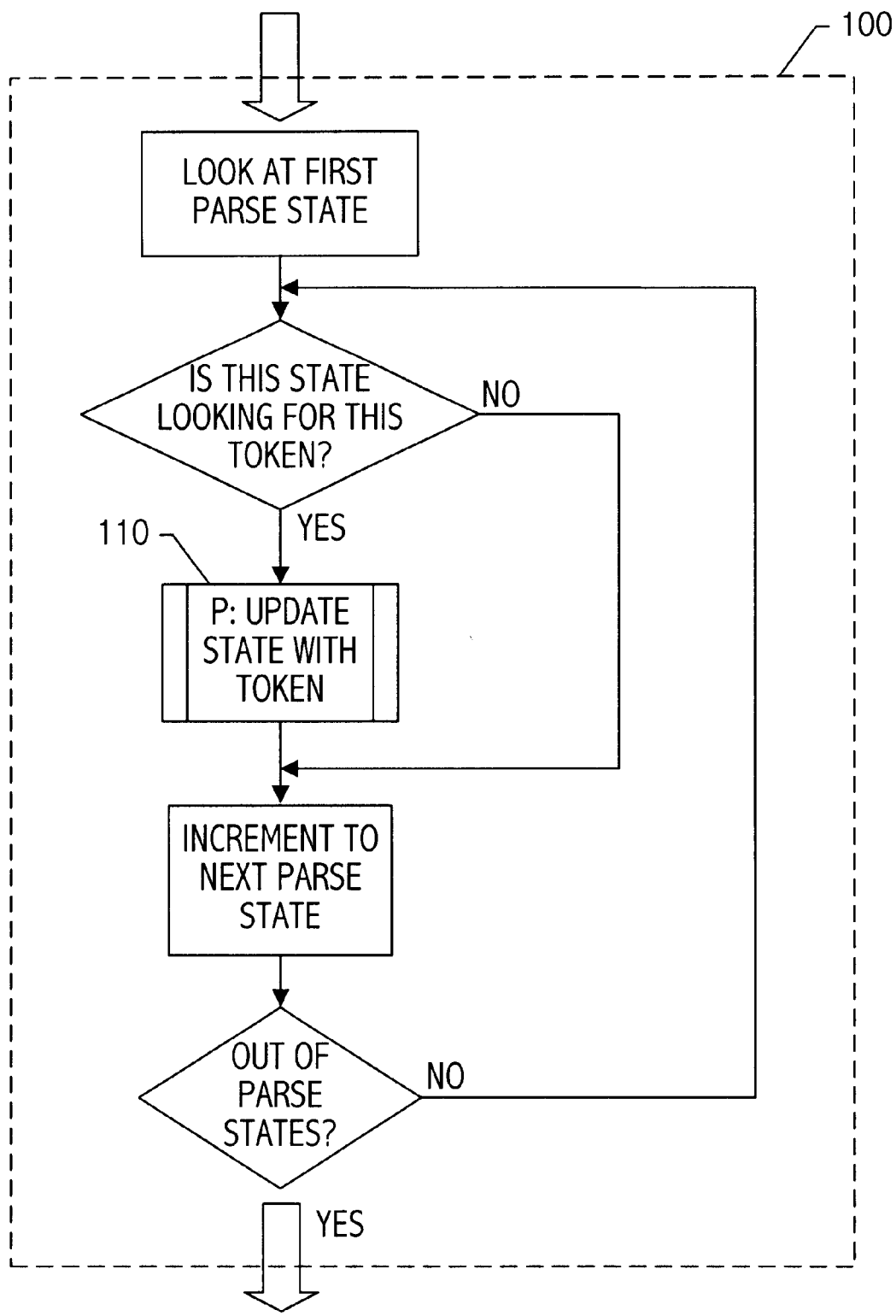
Figure 11:
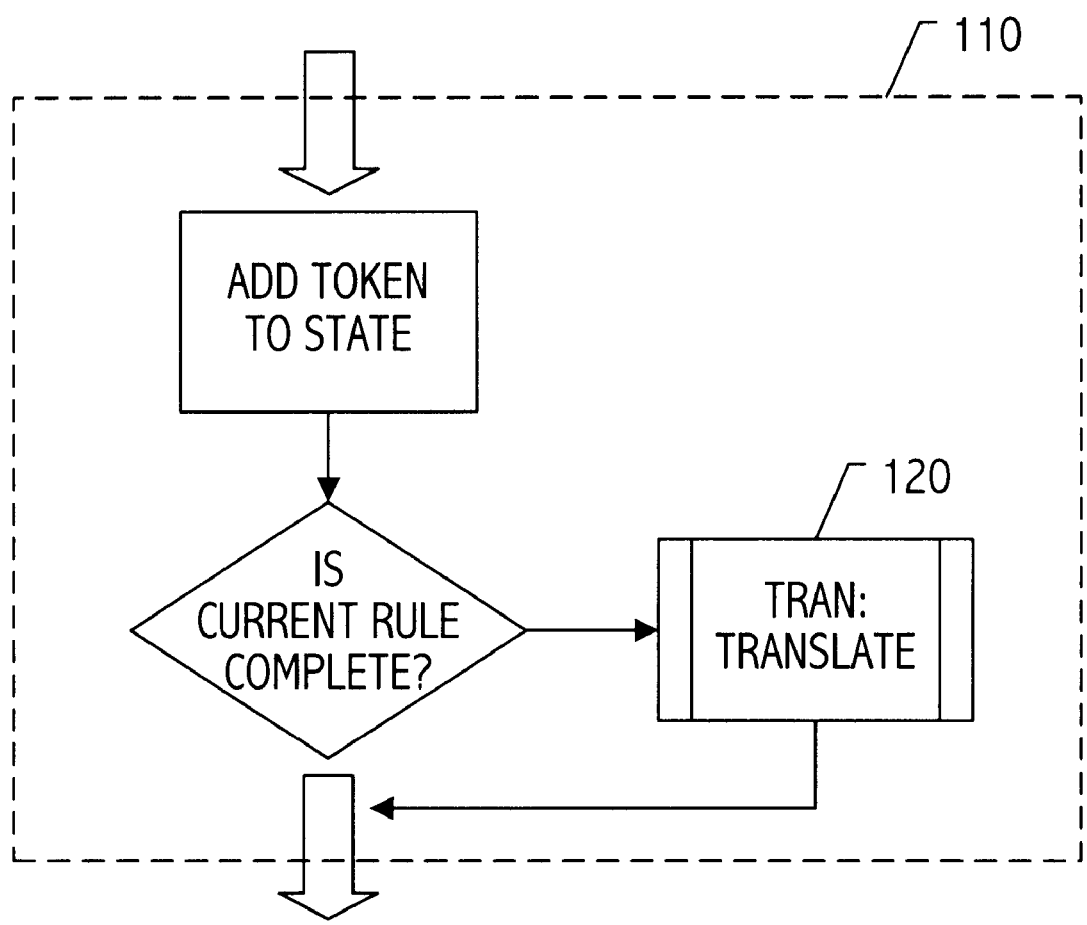
Figure 12:
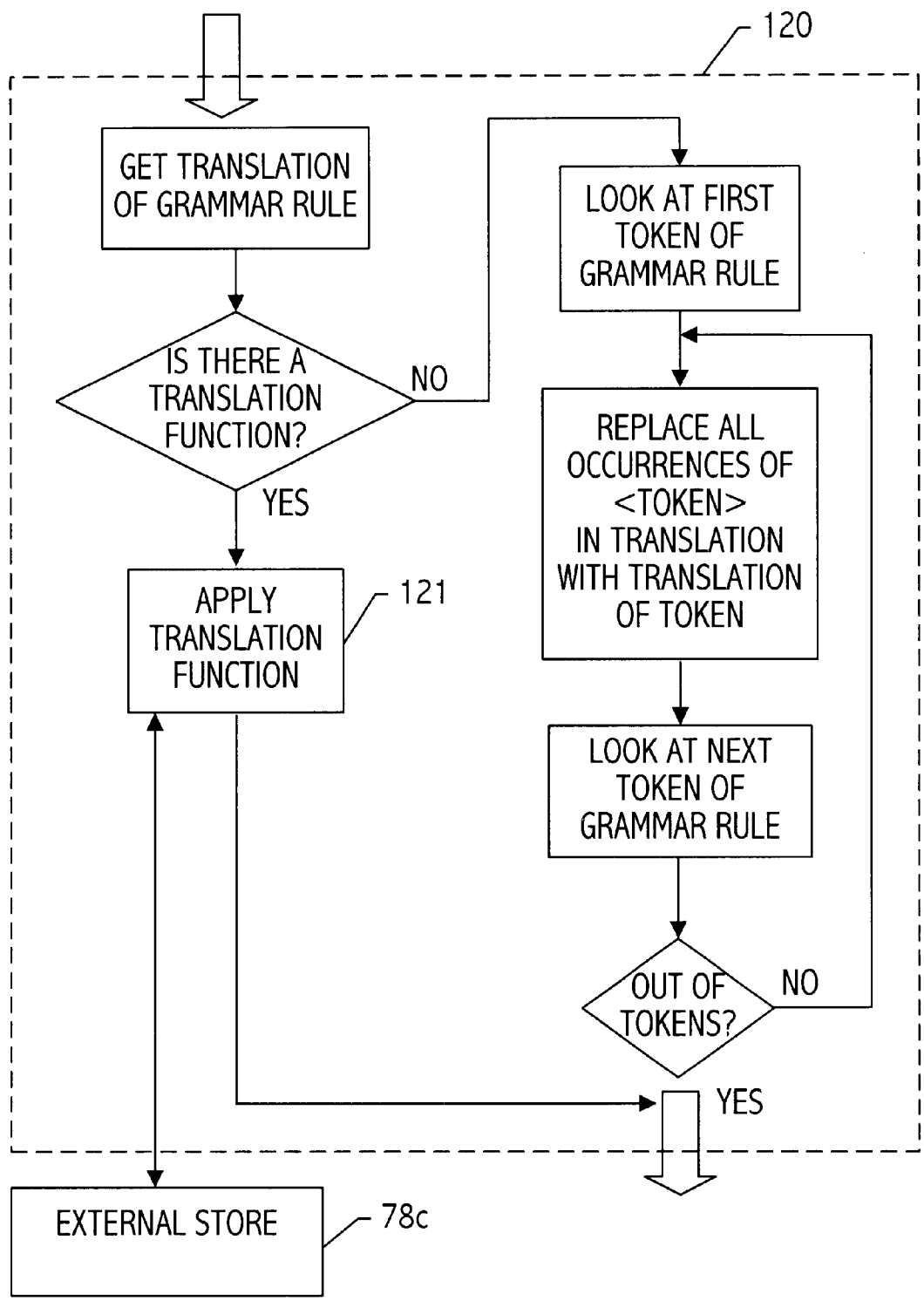

Referring again to FIG. 5, token recognizer 31 calls parser 32 to add (90) matched tokens to each parse state representation. Adding to parse states is performed as illustrated in FIG. 9. Parser 32 receives a set of input tokens (now matched and validated, if applicable) and applies (100) each to the parse states maintained by parser 32. FIG. 10 illustrates the application of an input token to each parse state beginning with the first parse state. If a given parse state is looking for the applied input token, that parse state is updated (110) by adding the token to the parse state as illustrated in FIG. 11. If, upon addition of the token, the governing phrase structure rule encoded in grammar 37 is complete (i.e., if a complete phrase has been parsed), translator 33 is invoked as illustrated in FIG. 12 and as described in greater detail below. Referring back to FIGS. 10 and 9, for each parse state and for each token, an instance of the parse state is updated (110) with the input token applied (100). In an exemplary configuration of parser 32, each parse state instance is checked to see if the token applies. If it does, the parse state instance is updated. If not, the parse state instance is dropped. If there are multiple tokens to apply, multiple instances of each parse state are created and a single token is applied to each corresponding parse state instance.

Referring now to FIG. 12, some embodiments in accordance with the present invention include two alternative translation facilities. If a translation function identifier is associated with a completed phrase structure rule, translator 33 invokes the corresponding translation function (e.g., translation function 121). In the case of a translation function, translator 33 may optionally query an external store such as external data stores 78c. External data stores 78a, 78b and 78c may be the same or different metadata stores, repositories or database environments. Alternatively, translation may be performed by applying the translation rule associated with phrase structure rule to the tokens of a completed parsed phrase. As described above, a translation rule encoded in a grammar (e.g., in grammar 37) may indicate that strings associated with tokens of a completed parsed phrase are to be concatenated (with or without blanks). Alternatively, an explicit translation rule including literal text or template language may be encoded in the grammar.

Exemplary Software Tool Environments and Other Embodiments

As previously described, one application environment in which the developed parser-translator technology may be utilized is data conversion. FIG. 2 provides an overview of an exemplary data conversion tool environment including a parser-translator. In particular, parser-translator component 20 includes token recognizer 21, parser 22, and translator 23 sub-components whose behavior is defined by grammar 27. Using parser-translator component 20, an output stream of data transformation statements is generated and inserted into slots of data access system templates to define data conversion programs suitable for performing a conversion of data represented in database 1 and storage of converted data into database 2. In the embodiment of FIG. 2, code templates (e.g., data access system templates 7) define a surrounding program framework for accessing and performing functions on data sources and targets as well as intermediate stores (e.g., intermediate stores 3.2). In particular, individual data access system templates define a generic shell of code for a particular operation to be performed (e.g., queries to a particular vendor's SQL database hosted in a particular computing environment). The semantics of the particular operation to be performed are supplied as an output stream from translator 23 and inserted into the appropriate data access system template.

In the embodiment of FIG. 2, token recognizer 21 and translator 23 query an external metadata store 28 that encodes schema and mapping information for source database 1 and target database 2. In this way, parser-translator component 20 may make a grammar driven query to retrieve schema information for source database 1 and target database 2. Depending on the particulars of the grammar, parser-translator component 20 may supply the results of such a query to the user as choices for adding to a business rule specification. Alternatively, parser-translator component 20 may use the results to qualify a user selection, which is consistent with the phrase structure rules of the grammar, against schema information represented in external metadata store 28.

A more detailed description of an exemplary data conversion environment is contained in U.S. Provisional Application No. 60/112,677, filed Dec. 17, 1998, which is incorporated herein in its entirety (including Appendices A and B thereto) by reference. Without limitation on the variety of data conversion environment embodiments in accordance with the present invention and without limitation on the component form or application environment in which the developed parser-translator technology may be utilized, Appendix A (entitled "ETI·EXTRACT® Tool Suite User's Guide") and Appendix B (entitled "ETI·EXTRACT® Tool Suite Reference Manual") describe a comprehensive data conversion environment well-suited to the developed parser-translator technology.

In particular, a specific exemplary set of tools is described for defining, editing and extending grammars such as grammars 37 and 27. Furthermore, the appendices illustrate the use of data access system templates such as data access system templates 7 and facilities for performing data conversions such as data conversion 3 in a wide variety of data access system environments. As described above, the developed parser-translator technology is particularly suitable as a core facility for providing a grammar-based natural language dialogue facility (as well as for batch mode interfaces) in a wide variety of software tool environments. The particular data conversion software tool suite described in Appendices A and B, namely the ETI-EXTRACT® FX Tool Suite, is merely exemplary and design choices and ancillary facilities illustrated therein should not be taken as limitations on the parser-translator technology described elsewhere herein.

Based on the description hereinabove taken together with that of an exemplary grammar-based data conversion environment in Appendices A and B, persons of ordinary skill in the art will appreciate a wide variety of suitable implementations. In addition, suitable grammar encodings and software tool environments may be better understood with reference to the detailed descriptions of Appendices A and B. While the description in Appendices A and B is useful to an understanding of an application environment that has shown particular commercial promise and that, based on the teachings herein, can benefit from the parser-translator technology described herein, many aspects of the particular data conversion software tool suite described in Appendices A and B are not essential to a particular embodiment of parser-translator technology.

While the invention has been described with reference to various embodiments, it will be understood that these embodiments are illustrative and that the scope of the invention is not limited to them. Many variations, modifications, additions, and improvements of the embodiments described are possible. For example, the particular software tools described are merely illustrative and a wide variety of potential application environments will be appreciated based on the description herein. Particular grammar encodings and allocations of functionality to parser-translator sub-components are merely illustrative and a wide variety of alternative encodings and alternative allocations of functionality will be appreciated based on the description herein. External query interfaces may be defined for a wide variety of execution environments consistent with the spirit and scope of the present invention.

Finally, apparati, articles, methods, systems, and computer program products in accordance with the present invention may take a variety of forms including, without limitation, as a parser-translator component integral with a software tool or provided separately as a component suitable for integration with a software tool or tools, as a grammar encoding defining behavior of a parser-translator component, as an integrated hardware software environment, as a standalone tool for guiding users through the definition of user language statements, as a parser only configuration without, or essentially without, translation functionality, etc. These and other variations, modifications, additions, and improvements may fall within the scope of the invention as described herein.

What is claimed is:

1. An apparatus comprising:
   an instance of a parser-translator software component executable to read an input stream encoding at least one business rule and to evaluate said input stream in conjunction with a grammar encoding an external query; and
   a software tool operable with said parser-translator instance to receive an output thereof corresponding to said at least one business rule, said output sensitive to an external context by operation of said external query.

2. An apparatus as recited in claim 1, further comprising:
a second software tool integrated with a second instance of said parser-translator software component to receive an external context-sensitive output thereof corresponding to said at least one business rule.

3. An apparatus as recited in claim 1,
wherein said external query includes access to one of a database, a repository and a metadata store external to said parser-translator instance.

4. An apparatus as recited in claim 1,
wherein said external query includes access to a data structure maintained by said software tool.

5. An apparatus as recited in claim 1,
wherein said software tool includes one or more of data conversion or migration, data analysis, data cleansing and data movement or replication components.

6. An apparatus as recited in claim 1,
wherein said external context sensitive output includes a directive for controlling operation of said software tool in accordance with said business rule and in accordance with at least one data or metadata state represented external to said parser-translator instance.

7. An apparatus as recited in claim 1,
wherein said external context sensitive output includes a data transformation statement for use by a program generator in generating a data conversion program.

8. A method of operating a data processing program in accordance with at least one business rule, said method comprising:
reading an input stream encoding said at least one business rule;
evaluating said input stream in accordance with a grammar encoding an external query to least one externally represented data or metadata state;
performing, in the context of said evaluating, said external query; and
supplying an operating directive for said data processing program, said operating directive corresponding to said at least one business rule and sensitive to said at least one externally-represented data or metadata state.

9. A method as recited in claim 8, further comprising:
supplying, via a user interface and in accordance with said grammar, selections for elements of said at least one business rule, wherein said selections supplied are constrained by results of said external query.

10. A method as recited in claim 8, wherein said input stream evaluating includes:
recognizing tokens from said input stream;
parsing said tokens; and
translating a sequence of said tokens to produce said operating directive.

11. A method as recited in claim 10,
wherein said recognizing includes performing said external query to constrain a set of candidate tokens to be recognized.

12. A method as recited in claim 11, further comprising:
supplying, via a user interface and in accordance with said grammar, said constrained set of candidate tokens;
interactively defining said at least one business rule using said constrained set of candidate tokens as selections for elements of said at least one business rule.

13. A method as recited in claim 10,
wherein said recognizing includes performing said external query to validate a token.

14. A method as recited in claim 10,
wherein said translating includes performing said external query to resolve an aspect thereof.

15. A method as recited in claim 8, further comprising:
supplying, via a user interface dynamically created in accordance with said grammar, selections for elements of said at least one business rule, wherein said selections supplied are constrained by results of said external query.

16. A system for providing business rule interoperability in a computing environment, said system comprising:
a computer readable encoding of a grammar including (i) rules descriptive of statements in a data transformation language for transforming between a first format and a second format and (ii) entries descriptive of data transformation language elements in said statements, at least one of said entries specifying an external query to resolve a corresponding data transformation language element at evaluation time; and
a parser-translator component executable to read an input stream encoding at least one business rule and evaluate said input stream in conjunction with said grammar encoding including said external query and, based thereon, to define a data transformation.

17. A system, as recited in claim 16, further comprising:
a second computer readable encoding of a second grammar, readable by said parser-translator component and thereby allowing said parser-translator component to read said input stream and define a second data transformation based thereon.

18. A system, as recited in claim 17,
wherein said first and second grammars specify a formal definition of a same language; and
wherein said first and second grammars specify translations specific to respective first and second data processing programs.

19. A system, as recited in claim 17,
wherein said first and second grammars specify substantially similar phrase structure rules; and
wherein said first and second grammars specify external queries specific to respective first and second data processing programs.

20. A system, as recited in claim 16,
wherein said data transformation specifies a transformation from one or more fields represented in one or more source data stores to one or more fields represented in one or more target data stores.

21. A system, as recited in claim 16,
wherein said data transformation specifies a directive to a data processing program for accessing data represented in one or more fields of one or more data stores.

22. A system, as recited in claim 16, wherein said external query specifies an ss to a data or metadata store external to said parser-translator component.

23. A system, as recited in claim 16, wherein said external query specifies an access to a data or metadata store external to both said parser-translator component and a data processing program.

24. A system, as recited in claim 16,
wherein said external query specifies an access to a data or metadata store associated with a data processing program, and wherein said data or metadata store is external to said parser-translator component.

25. A system, as recited in claim 16, wherein said data transformation is encoded as one of a string, a data structure and a software object.

26. A system, as recited in claim 16, wherein said data transformation includes object code callable by a data processing program.

27. A system, as recited in claim 16, wherein said data transformation includes statements formatted for use by a data processing program.

28. A data-driven system for providing business rule interoperability amongst multiple data processing programs, said system comprising:

first and second grammar encodings respectively specific to first and second data processing programs, both said first and said second grammar encodings including an external query;

an input stream encoding at least one business rule; and a single parser-translator component for, based on said first grammar encoding, parsing said input stream and translating said input stream into a first data transformation for use in conjunction with said first data processing program; and based on said second grammar encoding, parsing said input stream and translating said input stream into a second data transformation for use in conjunction said second data processing program.

29. A system, as recited in claim 28, wherein said input stream includes an interactive stream.

30. A system, as recited in claim 28, wherein said input stream includes a batch stream.

31. A method of interactively specifying a transformation of data from a first representation to a second representation thereof, said method comprising:

supplying a computer readable encoding of a grammar, said grammar including syntax rules descriptive of sequences of tokens in a data transformation language; and dictionary entries descriptive of terminal ones of said tokens, said dictionary entries including at least a first and a second entry respectively descriptive of at least first and second tokens, said first entry specifying at least one data transformation language element corresponding to said first token, and said second entry specifying an action to dynamically-query an external data source to resolve at least one data transformation language element corresponding to said second token;

based on said grammar encoding, presenting a user with at least one choice for a first element in a data transformation statement in accordance with said syntax rules; and presenting a user with successive at least one choices for successive elements in said data transformation statement in accordance with said syntax rules, wherein at least one of said successive element presentings includes performing a dynamic query in accordance with said second entry of said dictionary.

32. A computer program product including a grammar encoded by at least one computer readable medium, said grammar comprising:

a set of phrase structure rules defining orderings of tokens in said data transformation language;

a dictionary of entries descriptive of terminal ones of said tokens; and at least one encoding of a query to an external data or metadata store, wherein said grammar at least partially defines operation of a parser-translator to allow interactive definition of data transformation statements based in part on information accessed by performing said query.

33. A computer program product as recited in claim 32, wherein said at least one computer readable medium is selected from the set of a disk, tape or other magnetic, optical, or electronic storage medium and a network, wireline, wireless or other communications medium.

34. A computer program product as recited in claim 32, further comprising:

the parser-translator.

35. A method for interactively specifying a data transformation statement in accordance with a grammar including (i) rules defining orderings of tokens in a data transformation language for transforming between a first data representation in a first data store and second data representation and (ii) dictionary entries descriptive of terminal ones of said tokens, said method comprising:

supplying a computer readable encoding of said grammar, wherein a function identifier is associated with at least one of said dictionary entries, said function identifier encoding a run-time query to one of said first data store and metadata corresponding thereto; and based on said grammar, presenting a human user with choices for successive elements in said data transformation statement, wherein at least one of said choices is resolved by said run-time query.

36. A data processing system comprising:

a first data store encoding a grammar defining data transformation statements in accordance with a predetermined data transformation language;

a second data store encoding metadata descriptive of a structure of a first data set;

parser-translator means executable to access said first and said second data stores and having a user interface allowing a human user to interactively define a data transformation statement in accordance with said grammar, wherein at least one element of said data transformation statement is selected by said human user from alternatives resulting from a dynamic query of said metadata.

37. A data processing system, as recited in claim 36, wherein said data transformation statement encodes a transformation of source data represented in said first data set to target data represented in a second data set.

38. A data processing system, as recited in claim 36, wherein said data transformation statement encodes a transformation between a first data representation in said first data set to a second data representation utilized by a data processing program.

39. A data processing system, as recited in claim 36, wherein said data transformation statement encodes a transformation between a third data representation utilized by a data processing program and a fourth data representation in said first data set.

40. A data processing system, as recited in claim 36, wherein said data transformation statement encodes a transformation between source and t target data representation s each in said first data set.

41. A data processing system, as recited in claim 36, wherein said first data set includes a first database; and wherein said metadata includes a schema of said first database.

42. A computer program product including a grammar transmitted in at least one computer readable medium, said grammar at least partially defining actions to be performed by a computer in response thereto, said grammar comprising:

a set of phrase structure rules defining orderings of tokens in said data transformation language;

a dictionary of entries descriptive of terminal ones of said tokens; and at least one encoding of a query to an external data or metadata store, wherein said grammar at least partially defines operation of a parser-translator to allow interactive definition of data transformation statements based in part on information accessed by performing said query.

43. A computer program product as recited in claim 42, further comprising:

the parser-translator.

* * * * *

UNITED STATES PATENT AND TRADEMARK OFFICE
CERTIFICATE OF CORRECTION

PATENT NO.     : 6,523,172 B1
DATED          : February 18, 2003
INVENTOR(S)    : Juan Carlos Martinez-Guerra et al.

It is certified that error appears in the above-identified patent and that said Letters Patent is hereby corrected as shown below:

<u>Column 10,</u>
Line 59, "Dynamic Ouery Support" should read -- Dynamic Query Support --.

<u>Column 14,</u>
Line 60, "Dictionara Entries" should read -- Dictionary Entries --.

<u>Column 24,</u>
Line 58, "specifies an ss" should read -- specifies an access --.

<u>Column 26,</u>
Lines 60-61, "t target data representation s each" should read -- target data representations each --.

Signed and Sealed this

Fifteenth Day of June, 2004

JON W. DUDAS
*Acting Director of the United States Patent and Trademark Office*